United States Patent
Golubovsky

(10) Patent No.: US 10,922,751 B2
(45) Date of Patent: Feb. 16, 2021

(54) SYSTEMS AND METHODS OF IDENTIFYING RELATIVE ORDERING FOR ELECTRONIC DATA TRANSACTION REQUESTS

(71) Applicant: Nasdaq, Inc., New York, NY (US)

(72) Inventor: Leo Golubovsky, Franklin Lakes, NJ (US)

(73) Assignee: NASDAQ, INC., New York, NY (US)

( * ) Notice: Subject to any disclaimer, the term of this patent is extended or adjusted under 35 U.S.C. 154(b) by 614 days.

(21) Appl. No.: 14/928,644

(22) Filed: Oct. 30, 2015

(65) Prior Publication Data

US 2017/0103460 A1 Apr. 13, 2017

Related U.S. Application Data

(60) Provisional application No. 62/239,155, filed on Oct. 8, 2015.

(51) Int. Cl.
*G06F 16/00* (2019.01)
*G06Q 40/04* (2012.01)

(52) U.S. Cl.
CPC .................................. *G06Q 40/04* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,383,220 | B1 * | 6/2008 | Keith | G06Q 40/04 705/37 |
| 8,005,745 | B1 * | 8/2011 | Cleaves | G06Q 40/04 705/37 |
| 8,423,088 | B2 * | 4/2013 | Ickman | G06F 16/9535 455/566 |
| 9,515,891 | B2 * | 12/2016 | Ickman | H04L 41/22 |
| 2002/0091617 | A1 * | 7/2002 | Keith | G06Q 40/06 705/37 |
| 2004/0034591 | A1 * | 2/2004 | Waelbroeck | G06Q 50/188 705/37 |

(Continued)

OTHER PUBLICATIONS

Fleming, M. J., et al., "The Microstructure of a U.S. Treasury ECN: The BrokerTec Platform," Federal Reserve Bank of New York Staff Reports, Jul. 2009 (63 pages).

(Continued)

*Primary Examiner* — Farhan M Syed
(74) *Attorney, Agent, or Firm* — Nixon & Vanderhye P.C.

(57) ABSTRACT

An electronic exchange computing system is provided that includes a computer storage system, at least one transceiver, and a processing system. The storage system stores an electronic order book. The transceiver receives data transaction requests and transmits messages of an electronic data feed. The processing system generates an identifier, which may be referred to as a transaction identifier, for received data transaction requests. The identifier may be generated in a non-sequential and increasing manner such that it is greater than previously generated identifiers. The processing system will process the data transaction request and generate an electronic data feed message based on how data transaction request is handled. The electronic data feed message is sent to client computing system and includes the generated identifier.

19 Claims, 7 Drawing Sheets

(56) References Cited

U.S. PATENT DOCUMENTS

| | | | |
|---|---|---|---|
| 2009/0125387 A1* | 5/2009 | Mak | G06Q 30/02 |
| | | | 705/14.73 |
| 2010/0063892 A1* | 3/2010 | Keronen | G06Q 30/04 |
| | | | 705/26.1 |
| 2015/0127513 A1* | 5/2015 | Studnitzer | G06Q 40/04 |
| | | | 705/37 |
| 2016/0078537 A1* | 3/2016 | Katsuyama | G06Q 40/06 |
| | | | 705/37 |

OTHER PUBLICATIONS

NASDAQ TotalView-ITCH 4.1 (22 pages), retrieved Oct. 30, 2015.
NASDAQ TotalView-ITCH 5.0 (29 pages), retrieved Oct. 30, 2015.
http://www.nasdaqtrader.com/Trader.aspx?id=DPSpecs, (5 pages) retrieved Oct. 30, 2015.
U.S. Appl. No. 14/928,753, filed Oct. 30, 2015 (74 pages).

* cited by examiner

SYSTEMS AND METHODS OF IDENTIFYING RELATIVE ORDERING FOR ELECTRONIC DATA TRANSACTION REQUESTS

CROSS REFERENCE TO RELATED APPLICATIONS

This application claims priority to U.S. Provisional Application No. 62/239,155, which was filed on Oct. 8, 2015, and is related to the commonly assigned application entitled "SYSTEMS AND METHODS OF ELECTRONIC DATA PROCESSING," which is filed on even date herewith, and U.S. Provisional Application No. 62/239,173, which was filed on Oct. 8, 2015, each of which is hereby incorporated by reference for all purposes.

TECHNICAL OVERVIEW

The technology herein relates to electronic order processing and providing notification of such processing via electronic data message feeds. More particularly, the technology herein relates to generating a transaction identifier for data transaction requests received by an exchange and including the generated transaction identifiers in updates provided via the electron data feeds.

INTRODUCTION

Data transaction processing in important to modern day computing and relates to how computer systems receive, handle (e.g., process), and ultimately report on requests to perform data transaction(s). Data transaction processing is important in many different areas of technology including healthcare systems, reliability systems, security systems, automated manufacturing systems, automotive systems, transportation system control systems, and many other disciplines. A common use of transaction processing in the context of databases to help maintain the integrity of the data in the database. Typically this is handled in accordance with ACID properties (Atomicity, Consistency, Isolation, and Durability). An advantage of processing requests by using transactions is that many different computers or users can submit requests for processing and those requests will be handled by the system (e.g., in the order they are received).

While transaction processing can handle numerous separate requests it is often times difficult for computers (and users) to have information on whether or not their request has been acted upon by a data transaction computer system. In a typical scenario, such information comes in the form of an acknowledgement or response message that is directly sent to the computer that submitted the initial data transaction request (e.g., stating that the request has been handled and here are the results). However, in certain instances it is not always feasible to have a response message directly sent (or guarantee that one will be sent) to a computer in a timely manner. For example, such a response message may be delayed (e.g., through electronic network congestion or problems). Such problems can be an issue where actions and decisions can be made on a sub-second (or sub-millisecond) time-frame.

Electronic data feeds allow users to receive electronic updates from data sources. Such electronic feeds are generally public an used in many different environments, from the scoreboard of a golf tournament, to RSS feeds on the world wide web, to data feeds provided from electronic exchanges for market data. In the context of transactional processing, such electronic data feeds can provide updates regarding how individual transactions have been processed and/or messages that indicate how the transactions have been processed in aggregate.

Electronic exchanges make use of electronic market data feeds to disseminate information to market participants concerning activity that has occurred in the exchange. One example of an electronic market data feed is Nasdaq's TotalView-ITCH ("TotalView") protocol that Nasdaq provides to clients and associated computer systems. TotalView operates and sends event message data. This can allow for an efficient transfer of information from the exchange to the public. Specifically, instead of streaming the state of the entire book after each update, only the information on the limit order event that changes the order book is sent to market participants. For example, each limit order submission, cancellation, or execution can result in an individual event message being streamed to market participants. The total depth and view of the order book may be the sum of the (daily) history of limit order events or messages.

While this type of implementation can be beneficial in certain situations, it may not provide certain types of information that a client may consider useful. For example, consider a situation in which two orders are received by an exchange just a few microseconds apart. Both of the orders are buy orders for 500 at 100. In this type of scenario, it is possible that a public market data feed may report 500 shares were purchased at 100 and that 500 shares were added to an order book on the buy side at 100. In other words, one order was executed and one was placed into the order book. But in this situation, the computer system of the client that submitted the order may not be able to correlate or otherwise verify that the 500 share trade execution is related to their order or whether it was placed into the order book. Instead, they may need to wait until a trade confirmation is received through a private market data feed. Even though the time difference between reception of the private and public data feeds may be small, that difference may be crucial when high frequency trading algorithms operate on a microsecond basis.

Thus, in some instances, the nature of a particular electronic market data feed may not provide enough information for a market participant to know whether or not their order is reflected in the current (e.g., public or displayed) state of the order book.

Another problem is that protocols can operate at different speeds (e.g., have different latency). For example, "real-time" market data feed X may have a slightly different view on the state of an electronic order book than that shown with "real-time" market data feed Y. The state of the market may be different based on which market data feed (X or Y) is being relied upon. Again, while the time difference between these feeds may be small (either due to latency in the electronic communications that deliver the feed or the efficiency of the protocol), it can be enough to frustrate a market participant when the market appears to be in two different states at the same time.

Accordingly, new and more effective techniques for communicating data via electronic data feeds are needed.

SUMMARY

In certain example embodiments, an electronic exchange computing system is provided that includes a computer storage system, at least one transceiver, and a processing system. The storage system stores an electronic order book. The transceiver receives data transaction requests and transmits messages of an electronic data feed. The processing system generates an identifier, which may be referred to as a transaction identifier, for each received data transaction request. The identifier may be generated in a non-sequential and increasing manner such that it is greater than previously generated identifiers. The processing system handles the data transaction requests and generates electronic data feed messages based on how each data transaction request is handled. The electronic data feed message is sent to client computing systems and includes the generated identifier for a corresponding data transaction request. Successively generated identifiers may provide an indication, via the electronic data feed, as to the relative order in which the data transaction requests have been handled by the electronic exchange computing system.

In certain example embodiments, a transaction ID is included in a private data feed that is provided to a computing system of a customer. The private feed may be an acknowledgement message that the data transaction request has been received and/or that the data transaction request has been processed. With the transaction ID, a customer can identify which messages on the public data feeds are related to their previously submitted data transaction request. In certain instances, updates for a public feed may arrive at a customer computer before certain private feed messages. In such instances, the information on the public feed, by using the transaction ID, can be used to by a client computer system to correlate or otherwise recognize that the information relates to an order previously submitted a computer system of the client.

In certain example embodiments, an exchange may have multiple different market data feeds. In such instances, the generated transaction ID may be used across these different data feeds. The different information provided by the different market data feed may allow users to correlate messages in one data feed with messages in another data feed.

The features described herein may be combined to form additional embodiments and sub-elements of certain embodiments may form yet further embodiments. This summary is provided to introduce a selection of concepts that are further described below in the detailed description. This summary is intended neither to identify key features or essential features of the claimed subject matter, nor to be used to limit the scope of the claimed subject matter; rather, this summary is intended to provide an overview of the subject matter described in this document. Accordingly, it will be appreciated that the above-described features are merely examples, and that other features, aspects, and advantages of the subject matter described herein will become apparent from the following detailed description, figures, and claims.

BRIEF DESCRIPTION OF THE DRAWINGS

These and other features and advantages will be better and more completely understood by referring to the following detailed description of example non-limiting illustrative embodiments in conjunction with the drawings of which.

DETAILED DESCRIPTION

In the following description, for purposes of explanation and non-limitation, specific details are set forth, such as particular nodes, functional entities, techniques, protocols, etc. in order to provide an understanding of the described technology. It will be apparent to one skilled in the art that other embodiments may be practiced apart from the specific details described below. In other instances, detailed descriptions of well-known methods, devices, techniques, etc. are omitted so as not to obscure the description with unnecessary detail. Section headings are used throughout this Detailed Description solely in order to orient the reader as to the general subject matter of each section; as will be seen in the following text, the description of many features spans multiple sections, and headings should not be read as affecting the meaning of the description included in any section. For example, the inventors contemplate combinations of features that are discussed more than one of the sections.

Overview

In certain example embodiments, transaction identifiers (transaction IDs) are generated for each data transaction request (e.g., a request to buy or sell a security at a price, modify an existing order, cancel an order, etc. . . . ) received by an electronic exchange. In certain example embodiments, transaction IDs are incremented in a non-sequential manner on a security, order book, or type of security basis. For example, a newly generated transaction ID will be greater than all previously generated transaction IDs (e.g., for a given security or order book within a given time period) and it will be less than all subsequently generated transaction IDs. As explained in greater detail below, transaction IDs allow market participants to know or infer what information is known to the broader or public market (e.g., other market participants) in connection with a previously submitted data transaction request. In certain example embodiments, the transaction ID is generated to indicate the relative order in which successive data transaction requests (e.g. for a given instrument) are handled by an electronic exchange computing system.

Figure 1:
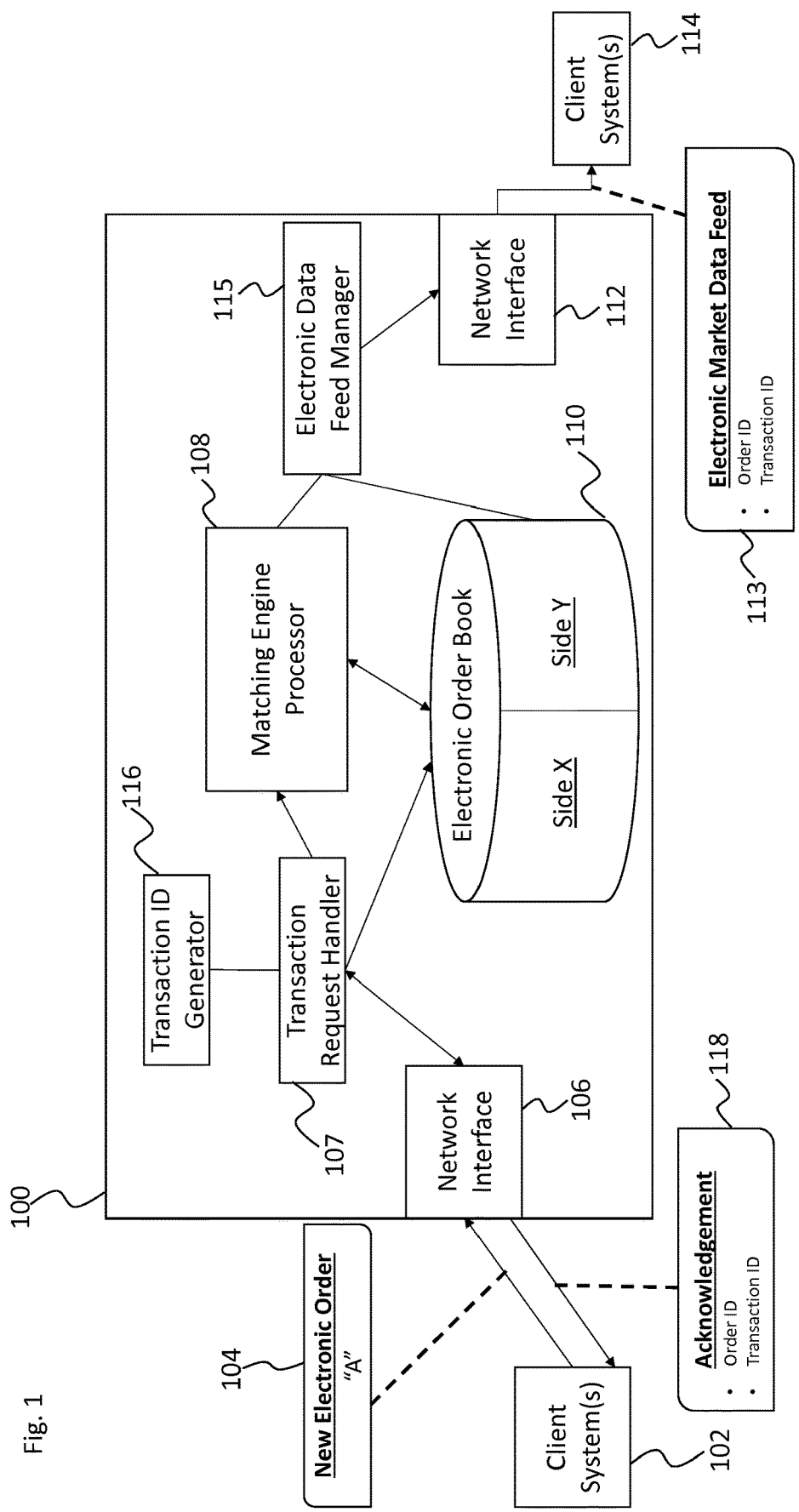
FIG. 1 illustrates a non-limiting example function block diagram of a computer-implemented exchange system that implements an example transaction ID generator and market data feed according to certain example embodiments.
Figure 2:
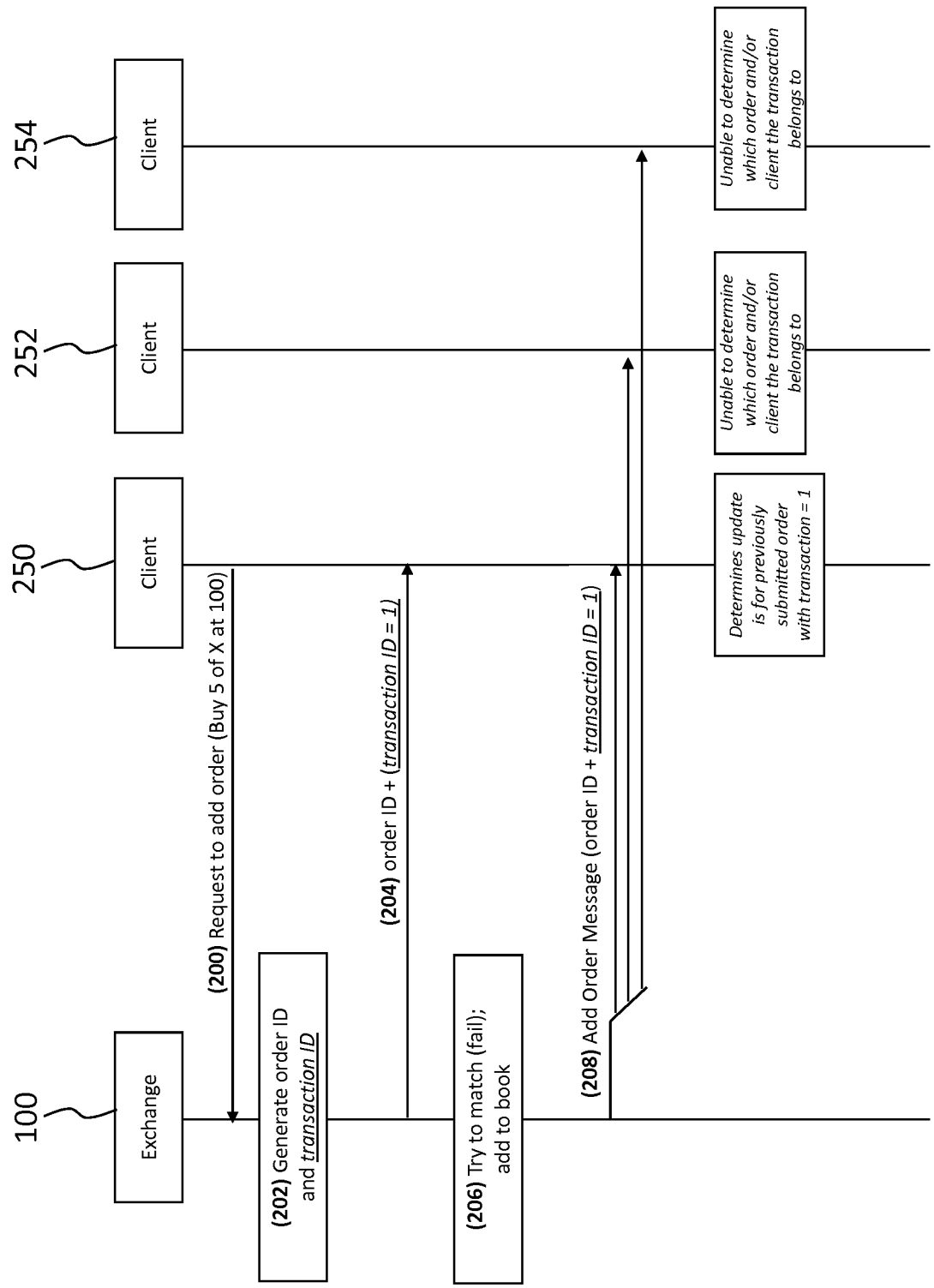
FIG. 2 shows a signaling diagram of generating a transaction ID for a new order according to certain example embodiments.
Figure 3A:
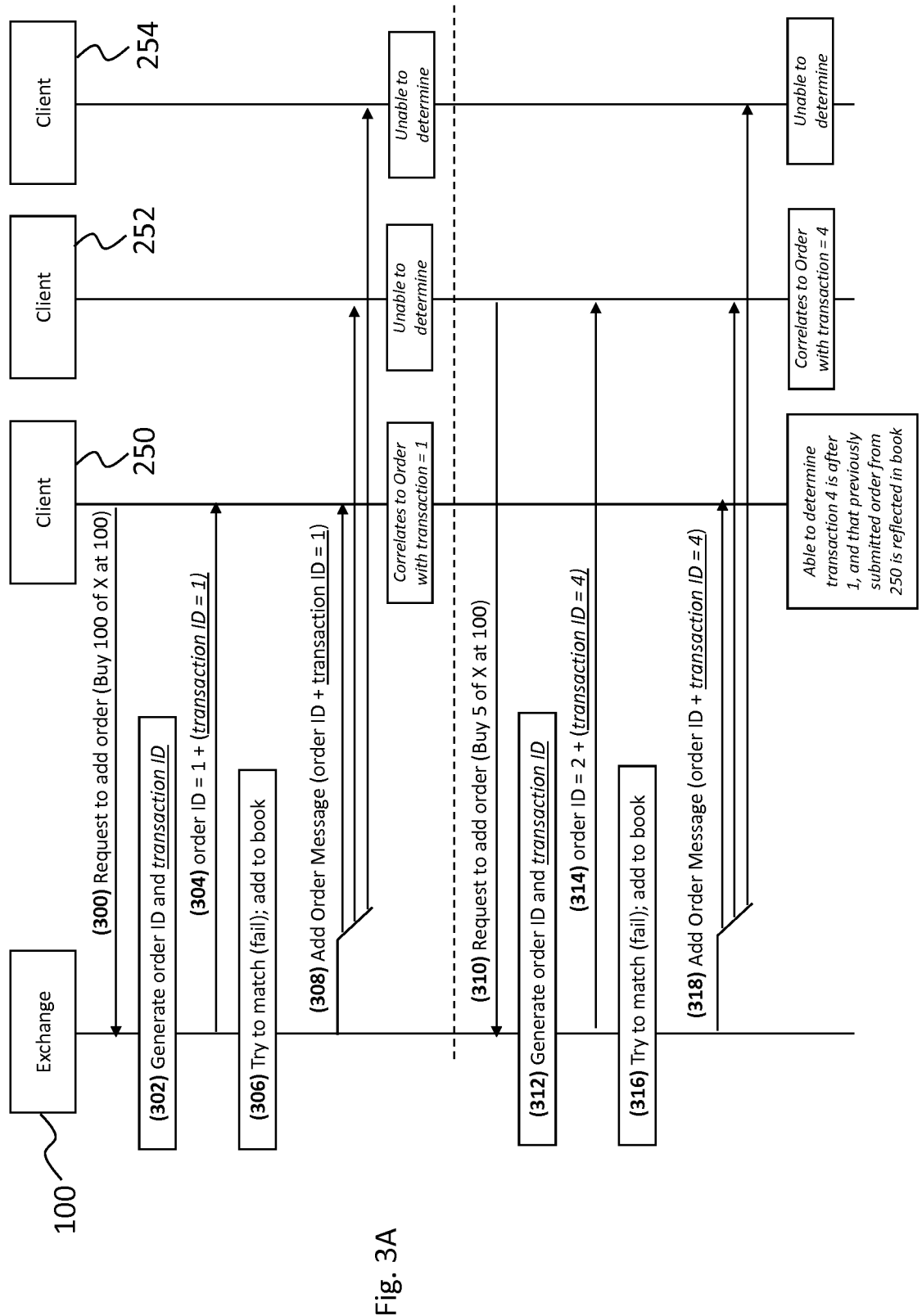
FIGS. 3A and 3B shows a signaling diagram of generating and using a transaction ID in a market data feed according to certain example embodiments.
Figure 3B:
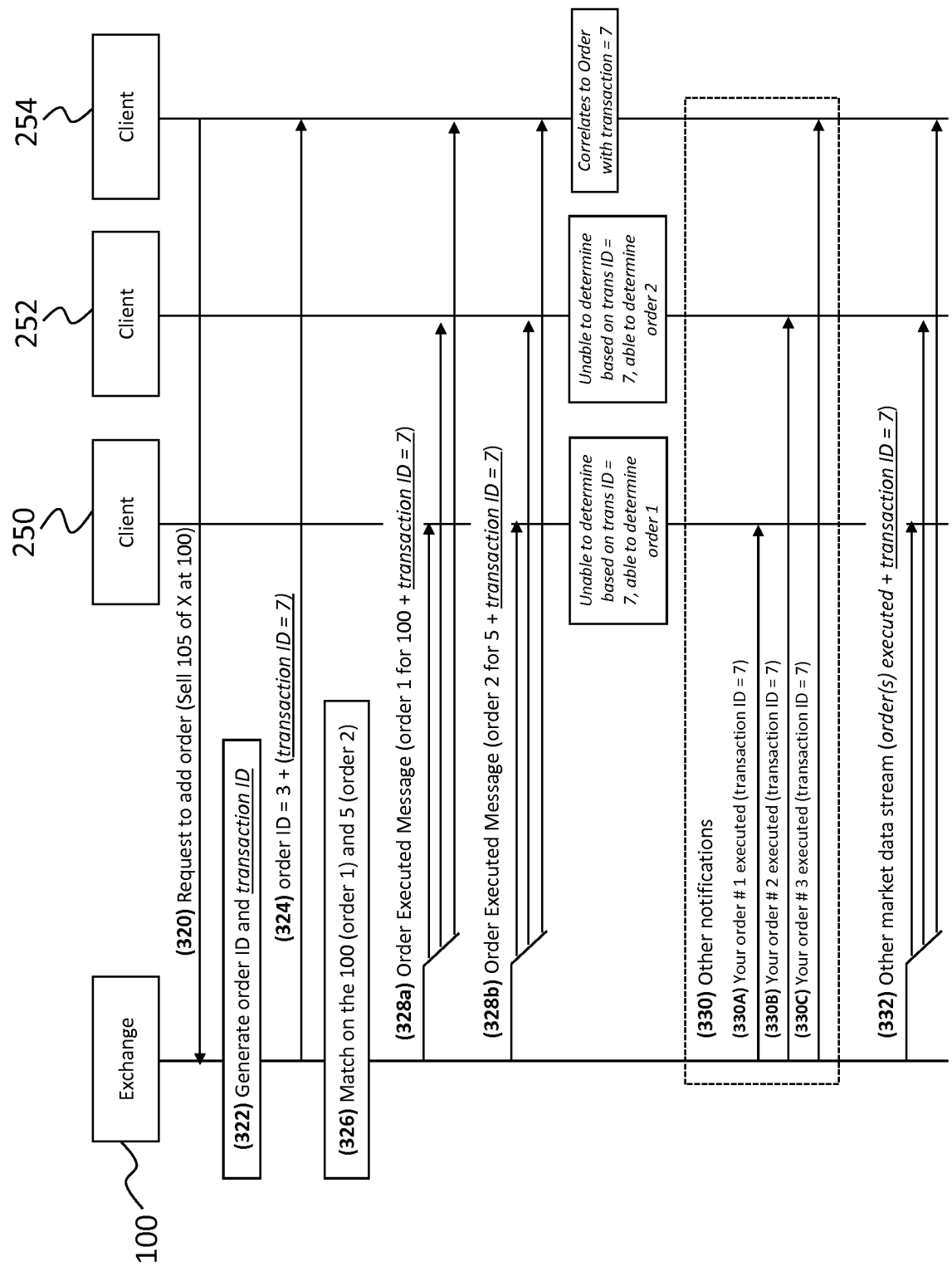
Figure 4A:
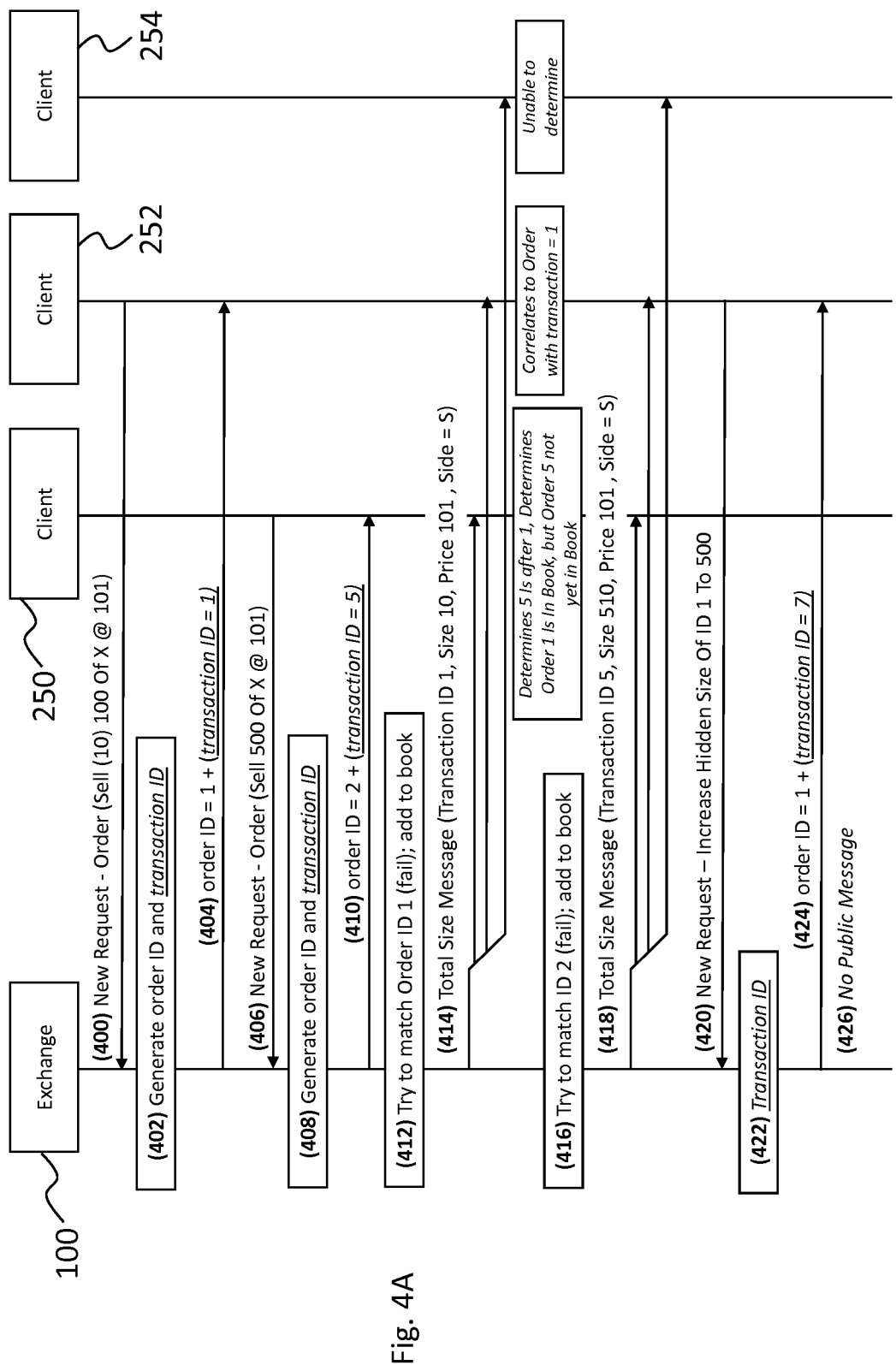
FIGS. 4A and 4B shows a signaling diagram of generating and using a transaction ID in another type of market data feed according to certain example embodiments.
Figure 4B:
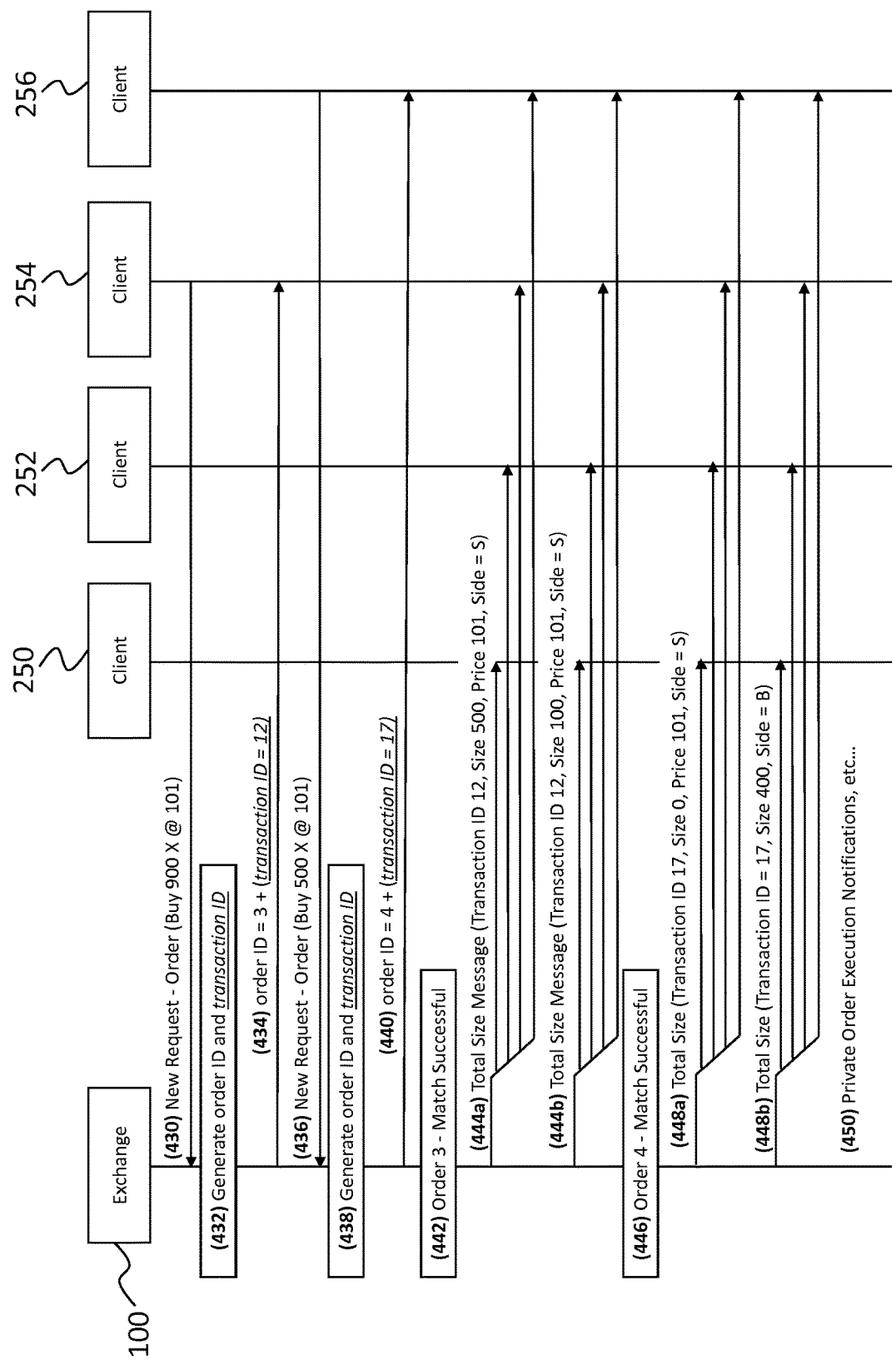
Figure 5:
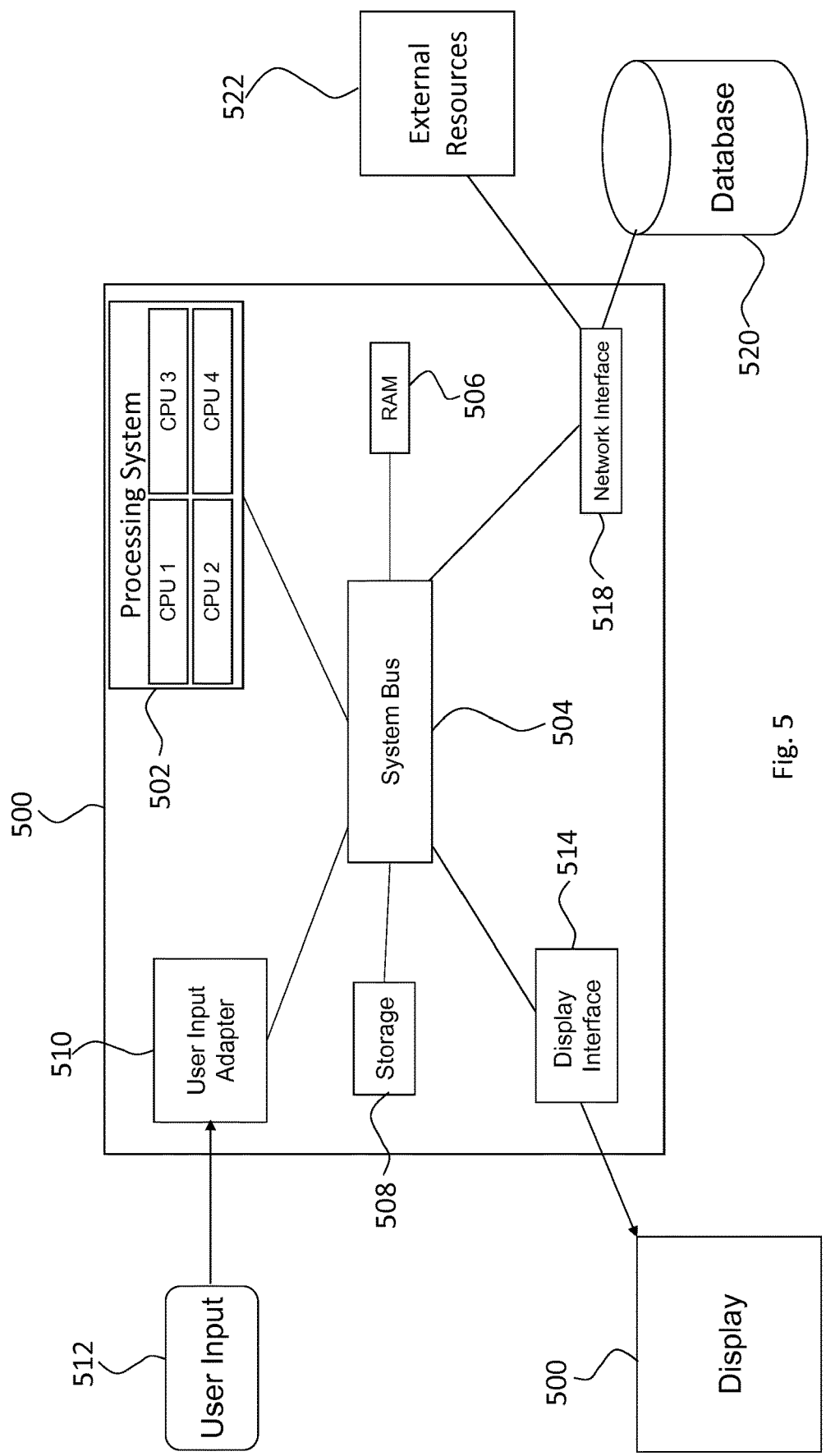
FIG. 5 is an example computer system according to certain example embodiments.

FIG. 1 shows an example exchange computing system in function-block form where the functions may be implemented on, for example, the example computer system shown in FIG. 5. FIG. 2 shows a first example of how a transaction ID may be generated and transmitted when an order is submitted to an electronic exchange computing system from a client computing system. FIGS. 3A and 3B show a second example process related to generation and transmission of a transaction ID. In particular, these figures show an example where an incoming order is matched against two pending orders. These are two separate matches (or trades), but the updates for both orders that are provided via an electronic data feed include the same transaction (e.g., that is associated with the incoming order). FIGS. 4A and 4B show a third example process for the generation and transmission of transaction IDs. These figures illustrate where two incoming orders are received in close temporal proximity (e.g., the orders are received within a time period before there is a public notification of the submission of either order) and the resulting benefits of having a transaction identifier included in the electronic data feeds.

Description of FIG. 1

By way of introduction, FIG. 1 illustrates a non-limiting example function block diagram of a computer-implemented exchange system 100 ("exchange" 100 hereafter) that implements an example transaction ID generator 116 and electronic market data feed 113 according to certain example embodiments. Exchange 100 may be implemented on one or computer computing servers or systems; such as the computer system shown in FIG. 5.

Exchange 100 includes network interface 106 for communicating with client systems 102 that submit data transaction requests, such as electronic order 104. Client systems 102 can be personal computers, mobile devices, automated computer systems, and the like. Generally, client systems 102 are any computer system programmed to interface with exchange 100 for the purpose of submitting data transaction requests, such as electronic orders 104.

Electronic data messages are submitted to exchange 100 via network interface 106 and include data transaction requests (e.g., a data transaction request to match a requested order to a pending, or future, contra-side order). Data transaction requests (e.g., electronic orders) can include various fields or attributes. Some fields may include, for example, a client ID that identifies the client (e.g., a company, person, etc. . . . ) sending the request, an instrument ID that identifies a particular instrument (e.g., a ticker symbol or the like), transaction type ID that may identify, for example, whether the request is associated with a sell or buy instruction, an order attribute that specifies whether this a regular order, a discretion order, a midpoint order, or the like, a quantity value that indicates the quantity of the order, a MinOrder value that indicates a minimum order amount that this order can be matched against, a price value that indicates a particular price for the order subject to the data transaction request, and whether the order is a "buy" or "sell" order (e.g., which side of the electronic order book is the new order going to interact with). In certain examples, other fields may be defined in the electronic order and/or some may be optional.

Once a data transaction request is received at network interface 106, it is passed to transaction request handler 107 for validation. Transaction request handler 107 validates newly received data transaction requests by confirming the fields in a request are valid. For example, certain types of orders may require a minimum order size. In accordance with such a requirement, transaction request handler 107 will perform a check to ensure the minimum order size has been satisfied. If the validation check fails, a response message may be transmitted back to the submitting client system 102 indicating that the order has been rejected and an explanation (e.g., an error code) as to why the order failed.

If the order is valid, transaction request handler 107 may then coordinated with (e.g., request) the transaction ID generator 116 to generate a unique transaction ID for the newly received data transaction request. In certain example embodiments, the generated ID may be unique for a particular instrument, an instrument type, an order book type for a particular instrument, and/or for a trading day for a given instrument (e.g., each day the transaction ID numbers reset to a base number, such as "1"). FIGS. 3 and 4, discussed in detail below, show an example of how a transaction ID may be generated for each newly received data transaction request. In certain example embodiments, transaction ID generator 116 generates a number that is greater than a previously generated transaction ID. In certain example embodiments, the number is not sequential with the prior number. For example, a first transaction ID may be "1" and the next transaction ID may be "5," with the next transaction ID being "7." In certain example embodiments, the generation of a transaction ID may be random or pseudo random. In other words, the next transaction ID may be "randomly" selected from a range of 20 (e.g., 20-39). A transaction ID generated for a data transaction request may be stored along with other details of a corresponding order and may be incorporated into an entry of the order into electronic order book 110. In certain example embodiments, transaction ID generator 116 may reset each day (e.g., such that the first transaction ID generated each day is the lowest transaction ID for that day, but not necessarily lower than the prior day).

Both transaction request handler 107 and transaction ID generator 116 may be a combination of suitable software that configures or programs a hardware process or just hardware (e.g., a suitably designed application-specific integrated circuit or field programmable gate array).

After generating a transaction ID for the newly submitted data transaction request, an acknowledgement message 118 may be generated and transmitted back to the order submitting client system 102 by using network interface 106 (or another network interface). The contents of the acknowledgement message may include an order identifier that is unique for the order and a transaction ID that is unique for the transaction that may be performed with the data transaction request associated with the order. In certain examples, an order ID is an identifier that is associated with an order for the length of its existence within the exchange. For example, the order ID will remain the same if the order is added to the electronic order book and remains in the book for several hours. In contrast, the transaction ID may be an identifier that is assigned to the data transaction request associated with the order. A data transaction request is generally a request that the exchange do something and more specifically can be a request to interact with the electronic order book for a security in some manner (e.g., add an order, update an order, cancel an order, execute an order, etc. . . . ). Accordingly, while the order ID of an order may remain the same, an order ID may end up being associated with different transaction IDs if there are multiple data transaction requests placed by the same client (e.g., multiple data transaction requests are associated with the same client ID) for that order. For example, an order with ID 1 may be added and have a transaction ID of 2 for that data transaction request (adding the order). Order ID 1 may then be modified and this further data transaction request may have an ID of 27. Next, the customer may cancel order ID 1 and that data transaction request may have a transaction ID of 74.

After (or in conjunction with) the transmission of the acknowledgement message that includes the transaction ID, the new data transaction request (e.g., to add an order) is passed to the matching engine processor 108. For newly received aggressive orders, matching engine processor 108 will attempt to match against contra-side resting or passive orders in electronic order book 110. In certain example embodiments, the transaction request handler (or another component) will interact directly with electronic order book to, for example, modify or cancel an order (e.g., if the data transaction request is for modifying or canceling).

Matching engine processor 108 can be a combination of hardware (e.g., a hardware processor, such as a central processing unit) and software or just hardware (e.g., a suitably designed application-specific integrated circuit or field programmable gate array). In certain example embodiments, in addition or alternatively to matching incoming aggressive orders, the matching engine processor may attempt to match orders already stored in the electronic order book 110 (e.g., two "resting" or "passive" orders). For example, market conditions (e.g., the state of the order book for a particular instrument) may change and cause two orders that were previously stored in the order book to match (or cross). In response to such a change, matching engine processor 108 may identify two orders that can match and trigger the execution of a trade between those two orders. In certain example embodiments, each security and/or electronic order book is assigned its own matching engine processor. In such instances, one matching engine per order book may be implemented and deployed. Such implementations may provide parallelism benefits and allow an exchange to handle tens, hundreds, thousands, or even millions of different securities (or order books) and millions or billions of trades each day.

Electronic order book 110 can be a data structure (e.g., a database, flat file, list, etc. . . . ) that holds multiple entries in electronically accessible memory (e.g., RAM, cache, registers, hard disk drives, etc. . . . ). Typically, an electronic order book has two sides, side X and side Y, which can be bid and offer/ask or buy and sell sides for the same instrument in the same electronic order book. The type of instrument that the order book is associated with can vary based on implementation and can include, for example, bonds (e.g., U.S. treasury notes of various denominations), stocks, and the like.

In certain example embodiments, processes performed by exchange 100 (e.g., matching, modifying, or canceling orders) in response to submitted data transaction requests may cause electronic data feed manager 115 to generate messages that are transmitted as part of market data feed 113 to other client systems 114 (e.g., other market participants) via network interface 112. As discussed herein, an example of a market data feed is the ITCH protocol from Nasdaq. An example protocol according to certain example embodiments is set forth below. Such protocols may generate (in correspondence with the exchange) messages for market data feeds. For example, a trade execution message (if the order is matched) may be included in market data feed 113. The trade execution message may include a transaction ID that is associated with the aggressing order and an order ID of the resting order that was matched. In certain example embodiments, an exchange has plural types of market data feeds that can provide different types of information for customers and their computing systems. In certain example embodiments, messages related to the processing of data transaction requests include a corresponding transaction ID. In certain examples, the information for correlation between an order ID and the transaction ID is only explicitly provided to the order submitting computer system (e.g., 102). This information may allow computer systems of the client to perform a correlating process to identifier messages on the electronic market data feeds (e.g., that are public) that may be attributed to data transaction requests from the client.

In certain example embodiments, one or more computer systems of a client that receive multiple different data feeds may be configured to automatically correlate information from the different data feeds based on identification of the same transaction ID within those data feeds. For example, when an order is initially submitted and a transaction ID is returned to the client computer system, that data may be added to a database (e.g., as discussed in connection with FIG. 5). A first computer system of the client may receive information from a first electronic data feed (e.g., that is public). This information may include transaction ID information (or other information related to order book activity) and may be added to the database. The first computer system (or another computer system) of the client may receive updates via a second electronic data feed that may also include transaction ID information. Those updates may also be added to the database. An analysis or correlation process may be performed (e.g., automatically) against the database to identify electronic data feed updates that can be attributed to a given transaction ID. In certain example embodiments, the results of the analysis or correlation process may cause an alert, notification, or the like to be generated (e.g., sent via email, SMS, text, a popup in an application or as part of a browser application, etc. . . . ). In certain example embodiments, the information may be used to generate a display (e.g., that may be in real-time) of the market. Such a display may show the status of the order book as represented by a combination of the updates from multiple public data feeds and the one or more private data notifications sent to computer systems of the client. The display may be shown on a monitor, television, screen of a mobile device, etc. . . . .

In certain examples, multiple different data fees may provide information to computing systems of customers at different speeds (e.g., the latency for transmission of market data updates may be different). In certain examples, one feed may provide information faster related to one kind of action taken by the exchange and another feed may provide information faster related to another kind of action taken by the exchange. In such circumstances, clients may program their computer systems to take automatic market actions (e.g., the submission of a new trade) based on this received information (e.g., updates received from one or more, or two or more, public electronic data feeds).

For example, a transaction ID generated for a submitted order (a data transaction request) is known to the submitter of the order (e.g., because it is included in the acknowledgement or confirmation message), the order submitter may then know if orders that are updated on a public data feed have a higher or lower transaction ID. A lower transaction ID may indicate that other market participants do not yet "know" about the newly submitted order. A higher number will reflect that the order has been processed and is now part of the public "book" for the particular instrument. Other market participants may not be able to perform such correlations (e.g., because they are not the recipient of a confirmation message that includes the transaction ID).

In certain example embodiments, a transaction ID for a newly received data transaction request is only saved for the processing of that request (e.g., while the matching processor is attempting to find a match for an order). If no match is found and the order is placed into the order book, then the transaction ID is no longer relevant. Alternatively, the transaction ID may be saved for later use (e.g., in a lookup table of a database that associates generated transaction IDs with order IDs).

Description of FIG. 2

FIG. 2 shows a signaling diagram for generating a transaction ID for a new order according to certain example embodiments. At step 200, a computer system of client 250 submits a new electronic data transaction request to exchange 100. The electronic data transaction request includes a request to "buy" 5 of stock X at a price of 100. The following are example data fields that may be included in the request at step 200.

| Example Data Transaction Request | | | | |
|---|---|---|---|---|
| Client ID | Instrument ID | Transaction Type ID | Price | Quantity |
| 250 | "X" | Bid | 100 | 5 |

Exchange 100 receives the transmitted request and then generates, at step 202, an order ID for the new order and a transaction ID for the transaction that will be performed with this order. In this example, the transaction ID is "1." In certain example embodiments, a value of 1 may indicate that this is the first transaction for this instrument to be performed for a trading day (or some other predefined time period—e.g., an hour, a 24-hour day, a week, a quarter, etc. . . . ). If will be appreciated that other types of sequencing for the transaction IDs may be contemplated. For example, the transaction IDs may be sequenced to decrease instead of increase (e.g., −1, −5, etc. . . . ). In such embodiments, transaction IDs that are lower may correspond to more recent transaction performed on the exchange. In certain example embodiments, a transaction ID is calculated so that it increases but is not sequential. The transaction ID may be calculated on a per security and/or matching engine basis.

After generation of the order ID and transaction ID, exchange 100 will generate and transmit a confirmation message to a computer system of client 250 at step 204. The confirmation message may include the recently generated order ID and the generated transaction ID of "1". In certain instances, this confirmation or acknowledgement message is sent over a "private" electronic market data feed (e.g., one that is only provided to the order submitting customer). Generally private electronic market data feeds are used to provide market participants with information specific to their orders that are not included on public electronic market data feeds (e.g., an indication of a total size of an order that includes hidden size or the discretion price of an order).

At step 206, the matching engine of exchange 100 performs a matching process by attempting to find a match for the order against contra-side orders that are resting in the electronic order book. In this example, the matching process does not find a match and the order is added to the electronic order book for that instrument.

As a result of adding the order to the book, an add order message (e.g., Table 11 in the below discussed example protocol specification) for a "public" (e.g., available to subscribing customers) electronic market data feed is generated by exchange 100 at step 208. Clients 250, 252, and 254 subscribe to the electronic market data feed and their computer systems receive updates based on actions taken by exchange 100. The updates are continuously transmitted by exchange 100 (or a corresponding computer system) and thus can be considered a "feed" of electronic information.

The add order message generated for the electronic market data feed includes the order ID for the order and the transaction ID generated in step 202. As each of clients 250, 252, and 254 subscribe to and receive (via respective computer systems) updates for the electronic market data feed, they will each receive the "add order" message that includes the order ID and transaction ID. As shown in FIG. 2, while all of computers for these clients receive the same message, the "meaning" of this message may be different depending on the other information that is known or otherwise stored in computer systems of the respective clients. Here, the computer system of client 250 may be able to identify (e.g., via an automatic and/or programmatic process) that a previously submitted order has been added to the order book. In contrast, the computer systems of clients 252 and 254 may only have sufficient information to know (e.g., programmatically determine) that an order has been added to the order book, but not enough information to know who (e.g., which client ID) the order belongs too.

Description of FIGS. 3A and 3B

FIGS. 3A and 3B show a signaling diagram of generating and using a transaction ID in a market data feed according to certain example embodiments.

In step 300, a new electronic data request is submitted from a client computer system (associated with client 250) to exchange 100. The electronic data request includes an order to buy 100 of instrument X at a price of 100. In response to reception of the order by the exchange, an order ID and transaction ID are generated at step 302. Once these identifiers are generated, a confirmation message is sent back to a computer system of client 250 at step 304 with the newly generated order ID and transaction ID.

In step 306, exchange 100 may attempt to match the order received in step 300 with orders that are resting in the electronic order book of the exchange. In certain example embodiments, this step is carried out in parallel or asynchronously (e.g., another process or thread) with the creation and transmission of the confirmation message back to a computer system of client 250. In certain example embodiments, steps 304 and 306 are serially or synchronously performed. In any event, in step 306, the exchange attempts to match the new order and does not succeed (e.g., there are no resting "offer" orders for 100 in the electronic order book). Because no match is found, the order is added to the buy side of the electronic order book at the indicated price (100) with the specified size (100).

In accordance with adding the new order to the order book, exchange 100 may generate (in step 308) an add order message for a market data feed. It will be appreciated that other types of messages may be generated according to how different market data feeds operate. In general, when a transaction occurs with the order (e.g., a match, adding to the order book, cancellation, or any other action that affects the order book for a security) the transaction ID may be included in a message that is sent out for that transaction for the given electronic market data feed. Examples of different messages for an example market data feed protocol are discussed below.

In step 310, a new electronic data request is submitted from a client computer system (client 252) to exchange 100. The electronic data request includes an order to buy 5 of instrument X at a price of 100. In response to reception of the order by the exchange, an order ID and transaction ID are generated at step 312. Once these identifiers are generated, a confirmation message is sent back to a computer system of client 252 at step 314 with the newly generated order ID and transaction ID.

In step 316, exchange 100 may attempt to match the order received in step 310 with orders that are resting in the electronic order book of the exchange. No match is identified for the new order and the order is added to the buy side of the electronic order book at the indicated price (100) with the specified size (5).

In step 318, an add order message is generated and will include the transaction ID and the order ID that was assigned to this new order. The add order message is then transmitted as part of an example electronic market data feed to computer systems of clients 250, 252, and 254 (e.g., similar to FIG. 2). As noted above, other market data feeds may generate and transmit other types of messages. These further electronic data feed messages may include at least the transaction ID (e.g., 4 in this example).

When the add order message is received and processed by computer systems of the clients, the computer system of client 250 may have information to positively identifier that client 250's order (associated with transaction ID 1) is prioritized ahead of (assuming the electronic order book is sorted on a price/time priority) the order associated with client 252.

In step 320, a computer system of client 254 submits an electronic data request that includes an order to sell 105 of instrument X and 100. In step 322, an order ID (3) and transaction ID (7) are generated for the new order and subsequently transmitted to a computer system of client 254 in step 324.

In step 326, exchange 100 attempts to match order ID 3 (sell 105 of X at 100) with contra-side orders (e.g., order IDs 1 and 2 that were added in steps 306 and 316) resting in the electronic order book. During the process, the matching engine of exchange 100 will match the 105 of order ID 3 with 100 of order ID 1 and then 5 of order ID 2.

In certain example embodiments, when an aggressive order (e.g., order ID 3 in this case) is matched against multiple passive orders, it is treated as one "transaction" (e.g., transaction ID 7) and the subsequent electronic data feed messages generated use the same transaction ID to indicate that these orders were matched in the same "transaction." Here, there are two order executed messages for the execution of order 3, and the same transaction ID is included in both messages. This information may indicate that both resting orders were filed by the same contra-order. Accordingly, electronic data feed message 328*a* is generated for the first match and includes order ID 1 and transaction ID 7. Computer systems that receive this message may then have sufficient data to programmatically determine that passive order 1 was executed with an aggressive order that was associated with transaction ID 7. However, of the computer systems that receive electronic data feed updates, only computer systems associated with client 254 may be able to programmatically correlate the details of the order associated with transaction ID 7. An example order executed message may include messages as set forth in the below discussed example protocol specification (e.g., Tables 12, 13, and/or 14).

Similarly, electronic data feed message 328*b* is generated for the second match and includes order ID 2 and transaction ID 7. Upon receiving this message, client computer systems may be able to programmatically determine that an aggressive order with at least 105 hit against both order ID 1 and order ID 2. However, only the computer systems of client 254 may have information (e.g., via updates provided from a private data feed) on the details of the aggressive order associated with transaction ID 7.

In certain example embodiments, order execution messages for an electronic data feed may not identify the aggressive order by order ID. Instead, for these updates computer systems may only receive information that indicates an order known to the computer system has been acted upon based on the included transaction ID. In certain example embodiments, messages may only identify the buy or sell side of a particular order book when order execution messages are generated. Thus, for example, the order ID of an aggressive sell order may not be included in a market data feed message because it is a sell order (as opposed to being an aggressive order).

In step 330, other notifications are sent. These notifications can include notifications 330A, 330B, 330C that are private messages that include further order details for the respective transactions.

In step 332, other electronic market data feeds may generate and provide updates to computer systems of subscribing clients. Such updates may be based or generated from the transaction(s) that was just performed against the electronic order book using order ID 3. For example, a market data feed may provide updates that include a total available volume at a given price level in the order book. Each update may provide a new total available volume. Such message updates may include a transaction ID.

It will be appreciated that the order of steps (328*a*, 328*b*, 330, and 332) in FIGS. 3A and 3B may be switched based on application need, latency, ran conditions, or other factors (e.g., the processing for step 330*a* finishes before the processing for step 328*a*). Thus, for example, private notification 330*a* may be first followed by generation and transmission of an order execution message in step 328*a*.

In another example, consider a situation where another client sent in, via a computer system, another order (Sell 105 of X at 100) right after client's 256 order (e.g., milliseconds or seconds apart) and before steps 328*a* and 328*b*. The new data transaction request received from the computer system of the other client may be assigned a transaction ID of 13. Thus, when a computer system of the other client receives the market data feed messages as indicated in steps 328*a* and 328*b* (with transaction ID=7), it will have information to determine the displayed order execution is not for the order that it (or another computer system of the other client) previously submitted. It will be appreciated that the time difference between the various steps shown in FIGS. 3A and 3B may be less than one second, one millisecond, one microsecond, or even less.

Description of FIGS. 4A and 4B

FIGS. 4A and 4B show another signaling diagram of generating and using a transaction ID according to certain example embodiments.

In step 400, a new data transaction request to sell 100 of X at 101 is received from a computer system of client 252. The included order indicates that only 10 of the total 100 quantity is to be displayed. In step 402, an order ID (1) and transaction ID (1) may be generated. In step 404, the order ID and transaction ID are sent to a computer system of client 252.

At step 406, close behind the reception of order ID 1, another data transaction request is received to sell 500 of X @ 101 from a computer system of client 250. In step 408 a new order ID (2) and transaction ID (5) are generated and returned to a computer system of the client in step 410. In step 412, exchange 100 may attempt to find a match for order ID 1. As no match is found, order ID 1 is added to the electronic order book.

As discussed herein, there may be different types of electronic market data feeds that can be used by an exchange. In the example in FIGS. 4A and 4B the electronic market data feed is size (and price) based as opposed to order based. The market may report the total (or displayed) size available at all prices (e.g., displayable prices) that are in the electronic order book. Accordingly, in step 414, in accordance with addition of order ID 1 to the order book, a total size message is generated and sent to computer systems of the respective clients via the public electronic market data feed. The total size message includes the transaction ID associated with the request for order 1 along with the size at the price of order ID 1. As there are no other orders at 101, the total size of the security at 101 is 10. Of course, depending on product requirements, other types of data messages may be generated at this point (e.g., an add order data message as shown in Table 11 of the below protocol specification).

In certain example embodiments, plural electronic market data feed types may be used for one order book, security, or exchange. Different types of feeds may be subscribed to by different customers and provide different types of information for customers. Thus, multiple market data messages for different market data feeds may be generated for one transaction. For example, a total size message and an add order message may be used in response the addition of an order (e.g., Order ID 1) to an order book.

In step 416, exchange 100 then attempts to match order ID 2 with orders resting in the order book. As with order ID 1, there are no matches, and order ID 2 is added to the electronic order book of exchange 100. In accordance with the addition of order ID 2 to the electronic order book, in step 418 another total size message is generated and sent to computer systems of clients 250, 252, and 254. This new message includes transaction ID 5, the total size at a price of 101 for that security, and a value that indicates the side of the order book that this offer is on (the sell side in this example).

In step 420, a computer system of client 252 submits another electronic data transaction request to increase the total size, but not the displayed size, of order ID 1 to 500 (from 100). In response to this request and in step 422, exchange 100 generates a transaction ID (7) for this transaction. In certain example embodiments, a new order ID is not generated as there is already an order ID (1). Instead, only a transaction ID is generated for this new data transaction request. In certain example embodiments, a new order ID may be generated and either supplement or replace order ID 1. In any event, a transaction ID of 7 is generated because the requested data transaction requested will modify or "touch" the electronic order book (e.g., by increasing the amount that is available for trading). In certain example embodiments, a transaction ID is generated and associated with each such request. In step 424, a responsive confirmation message that includes the transaction ID is generated and transmitted to a computer system of client 252.

Unlike prior data transaction requests, the request to increase the hidden size of an order does not generate a message for a public market data feed because it is modifying a hidden or "dark" property of the order and will not affect the publically displayed aspects of the order book (e.g., the displayed size of the security is not changed). Thus, computer systems of other clients (e.g., 250 or 254) are not provided with any information over the market data feeds that could indicate the true size of order ID 1.

In step 430, an electronic data request to buy 900 of X at 101 is received from a computer system of client 254. An order ID (3) and transaction ID (12) are generated for this order in step 432 and transmitted, at step 434, to a computer system of client 254.

In step 436, an electronic data request to buy 500 of X at 101 is received from a computer system of client 256. An order ID (4) and transaction ID (17) are generated for this order in step 438 and transmitted, at step 440, to a computer system of client 256.

In step 442, exchange 100 attempts to match order ID 3 with resting orders of the electronic order book. In this example, two matches are found. The first is a match against order 1 for 500 (the full amount of the order) and the second match is against order 2 for 400, which leaves 100 remaining for order 2 in the order book. In certain example embodiments, once a match is found (e.g., the first match), a message is generated for the market data feed(s). Subsequently, the second match may be found and a corresponding message generated for the second match. In certain example embodiments, all matches are found, then all messages are generated for those matches.

In any event, in accordance with the two executed trades, multiple total size messages are generated and sent in steps 444a and 444b. Both of these messages include the transaction ID (12) associated with order ID 3. The message in step 444a is generated in response to matching 500 of order 3 to the 500 size of order 1. Order 1, as discussed above, had a displayed size of 10 with a total size of 500. As a result of this match, the generated message in step 444a has a transaction ID of 12, a size of 500 (the remaining size from order 2), and the indicated price or level (101). At this point (e.g., when a computer system of client 254 receives the message generated in step 444a), the computer system of client 254 has information to determine that 10 of the submitted order for 900 was executed. A computer system of client 254 will receive confirmation through a private feed (e.g., in step 450) that 490 of the order for 900 was fulfilled via a hidden order. In contrast, the computer systems of the other clients (other than client 252) will not be provided with information that more than 10 was actually traded. In certain example embodiments, other client computer systems may be notified regarding the full trade amount. In certain example embodiments, an electronic data feed may provide updates in the form of a total traded volume and/or an available volume at a best bid/offer or another bid/offer price.

In certain example embodiments, a generated order execution message for order 1 may also be provided and may include the amount that was displayed for order 1 (e.g., 10). In certain example embodiments, no market data feed message is generated (e.g., the entire trade occurs in the dark or is hidden). For example, if order 1 was an entirely dark order (all 500 being hidden), no message would be generated for the public electronic market data feeds.

The inclusion of the transaction ID in the messages in steps 444a and 444b can provide information to, for example, a computer system of client 256 as well. For client 256, despite having an order already submitted to exchange 100 (prior to processing in 442), a computer system of client 256 may be able to programmatically determine that the first size message does not relate to order 4 because the transaction ID in the message 12 and not 17. Accordingly, a computer system of client 256 may determine (e.g., programmatically) that the total size messages are not a result of the execution of order 4 and also determine that an order has yet to be processed (or at least an indication of its processing has not been provided through the market data feeds).

Returning to FIG. 4B, in step 444b the exchange matches the remaining 400 of order 3, and generates another message that indicates 100 is remaining at the price level of 101. In step 446, exchange 100 attempts to match order 4 with orders resting in the order book. As there is 100 of order 2 left over from the match in step 442, another match is identified for 100.

In step 448a, another total size message is generated and sent out via the electronic market data feed with information that order 2 was executed for a size of 100 with transaction ID 17. There are no more matches at the price level of 101.

As there is 400 remaining in size for order 4, the remaining size is added to the order book. This add action also generates a market data feed update at step 448*b*. A total size message indicates that there is now 400 on the buy size at a price level of 101. The transaction ID for the message is also 17 as the exchange treats the addition of left over size to an order book and matching of the order as the same transaction (e.g., it is concerned with the same aggressive order). In certain example embodiments, different types of market data feed messages may generate and use different transaction IDs. For example, messages 448*a* and 448*b* may use different transaction IDs. In this case, the transaction ID generator may generate a new transaction ID and notify a computer system of the client of this new ID.

In step 450, the exchange (or associated computing system) may generate and send private notification messages. As discussed above, such messages may include the full details of a trade or the details of hidden or dark trades. These messages may also include transaction ID. Thus, for example, an order execution message may be sent to a computer system of client 254 with a transaction ID of 12, that an order for 500 was completed, and only 10 of that 500 order was displayed.

Description of FIG. 5

FIG. 5 is a block diagram of an exemplary computing system 500 according to certain example embodiments (e.g., an exchange computing system as described in FIG. 1, a user device as shown in FIG. 1, etc. . . . ). Computing system 500 includes a processing system 502 with CPU 1, CPU 2, CPU 3, CPU 4, a system bus 504 that communicates with RAM 506, and storage 508. The storage 508 can be magnetic, flash based (e.g., for a mobile client device), solid state, or other storage technology. A storage system may comprise cache memory that are on the computer chip of CPU 1, RAM 506, storage 508, hardware registers, external systems 522, and the like.

In certain example embodiments, an electronic order book may be stored in the storage system of the computing system. In certain examples, portions of the electronic order book and/or instructions for software functionality described herein may be concurrently stored one or more memory devices that include cache memory, RAM 506, storage 508, hardware registers, and/or external systems 522.

In certain example embodiments, the processing system 502 is programmed (e.g., via a series of program instructions) to carry out the process and/or one or more of the steps/actions shown in FIGS. 2, 3A, 3B, 4A, and/or 4B. In certain example embodiments, the processing system is programmed to achieve the results shown in FIGS. 2, 3A, 3B, 4A, and/or 4B. In certain example embodiments, the processing system is programmed so that one core (e.g., CPU 1) handles all processing for a given electronic order book (e.g., a first instrument), while another core (e.g., CPU 2) handles processing for another electronic order book (e.g., a second instrument).

In certain example embodiments, the processing system is programmed to implement functionality associated with the transaction request handler 107, the transaction ID generator 116, the matching engine processor 108, and/or the electronic data feed manager 115 as shown and described in connection with FIG. 1. Additionally, functionality may also be programmatically implemented for an example computing system.

The system bus 504 communicates with user input adapter 510 (e.g., PS/2, USB interface, or the like) that allows users in input commands to computing system 500 via a user input device 512 (e.g., a keyboard, mouse, touch panel, or the like). The results of the processing may be displayed to a user on a display 516 (e.g., an LCD) via display interface 514 (e.g., a video card or the like). In certain example embodiments, commands to computing system 500 may be provided via network interface 518 (discussed below). In certain example embodiments, representations of the electronic order book and/or processing of the electronic order book may be displayed on display 516 or a display that is communicatively coupled to computing system 500 via network interface 518. In certain example embodiments, orders for an example exchange computing system implemented via computing system 500 may be directly entered via user input device 512. Certain examples embodiments may include one or more user input adapters (e.g., a keyboard and mouse). Certain example embodiments may include one or more output devices (e.g. multiple monitors and/or multiple display interfaces).

The computing system 500 may also include a network interface 518 (e.g., a transceiver) to facilitate wired (e.g., Ethernet-802.3x) and/or wireless communication (WiFi/802.11x protocols, cellular technology, and the like) with external systems 522, databases 520, and other systems via network 524. External systems 522 may include other processing systems, systems that provide third party services, etc. External systems 522 may be client devices or server systems.

In certain example embodiments, an electronic data feed may be provided to external computing systems via network interface 518 and use or be based on the ITCH protocol. For example, an exchange computing system may transmit, as part of an electronic data feed, electronic message to client computer systems. Respective client computing systems may receive such messages via an included network interface. The data included in the messages may be processed by a processor of the client computing system and incorporated into a data structure that is maintained by the client computing system that is either similar to the order book or different. In certain example embodiments, images (e.g., that represent total volume or a number of orders) may be generated and presented via displays coupled to the client computing system.

In certain example embodiments, messages for the electronic data feed (e.g., from an electronic exchange computing system) are formed based on the example specification discussed in more detail below. For example, processing system (e.g., via electronic data feed manager 115), generates a message according to the below discussed specification based on changes to the electronic order book stored in the storage system of the electronic exchange. The generated message may then be transmitted, via network interface 518, to other computing systems, such as client computer systems. Client computer systems may be programmed to receive such messages and, for example, store the received message to a database or incorporate the information into a visual representation of the electronic order book (e.g., to display the best bid and/or offer, the currently available quantity, outstanding orders for that client, etc. . . . ).

External systems 522 may also include network attached storage (NAS) to hold large amounts of data. External systems, along with the internal storage and memory, may form a storage system for storing and maintaining information (e.g., order book information, routing strategies, etc. . . . ). Such a system may communicate with users and/or other computing systems that process electronic order data messages. For example, an external system may be specifically programmed to provide market data feed updates to subscribing clients (e.g., computing systems of subscribing clients) based on changes to the order book managed by the exchange. The database 520 may include relational, object orientated, or other types of databases for storing information (e.g., order book information for a financial instrument).

In certain example embodiments, the storage system of the computer system may store instructions that cause one or more processors (e.g., the processing system) of the computer system to perform each or any combination of actions described herein as performed by, for example, an exchange computer system, a client computer system, and/or an external computer system.

In certain example embodiments, a method can include each or any combination of actions described herein as performed by an exchange computer system, including the exchange computer systems of FIGS. 1 and/or 5. In certain example embodiments, a method can include each or any combination of actions described herein as performed by a user device.

In certain example embodiments, a computing system includes each or any combination of the components shown as included in the exemplary computing system 500 of FIG. 5, where the each or any combination of the components are configured to perform the method(s) in the above paragraph(s) or the processes, steps, and/or actions shown in FIGS. 2-4B.

In certain example embodiments, a processor is configured or programmed to perform the method(s) above and/or the processes, steps, and/or actions shown in FIGS. 2-4B.

In other words, the processes, techniques, and the like, described herein (for client devices, server, exchange, and/or controller systems) may be implemented on a computing system. Such implementations may then configure or program the processing system to carry out aspects according to certain example embodiments. It will be appreciated that other architecture types may be used. For example, a single CPU may be used instead of multiple CPUS. Alternatively, a processing system may include multiple CPU "cores." Further, the various elements shown in connection with FIG. 5 may be included into one cohesive physical structure (e.g., such as a tablet device). The components and functionality shown in FIGS. 1-4B may be implemented on or in conjunction with the example computing system shown in FIG. 5 (e.g., to thereby create a specific purpose computing machine).

Individual function or process blocks are shown in the figures. Those skilled in the art will appreciate that the functions of those blocks may be implemented using individual hardware circuits, using software programs and data in conjunction with a suitably programmed hardware, using applications specific integrated circuitry (ASIC), and/or using one or more digital signal processors (DSPs). The software program instructions and data may be stored on non-transitory computer-readable storage medium and when the instructions are executed by a computer, or other suitable hardware processor, control the computer or hardware processor to perform the functionality defined in the program instructions.

Although process steps, algorithms or the like may be described or claimed in a particular sequential order, such processes may be configured to work in different orders. In other words, any sequence or order of steps that may be explicitly described or claimed does not necessarily indicate a requirement that the steps be performed in that order. The steps of processes described herein may be performed in any order possible. Further, some steps may be performed simultaneously (or in parallel) despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention(s), and does not imply that the illustrated process is preferred. A description of a process is a description of an apparatus for performing the process. The apparatus that performs the process may include, e.g., a processor and those input devices and output devices that are appropriate to perform the process.

Various forms of non-transitory, computer-readable media may be involved in carrying data (e.g., sequences of instructions) to a processor. For example, data may be (i) delivered from RAM or cache to a processor; (ii) or instructions for a process may be stored in an instruction register and loaded by a processor. Instructions and/or data may be carried or delivery over other types of transmission mediums (e.g., wire, wireless, optical, etc.) and/or transmitted according to numerous formats, standards or protocols, such as Ethernet (or IEEE 802.3), SAP, ATP, Bluetooth, and TCP/IP, TDMA, CDMA, 3G, etc.; Such transitory signals may be coupled to non-transitory media (e.g., RAM, cache, hard drive, a receiver, registers, etc. . . . ), thus transitory signals will be coupled to non-transitory media. The transitory and non-transitory signals, instructions, and/or data, may be encrypted to ensure privacy or prevent fraud in any of a variety of ways well known in the art.

The following are example messages and corresponding specification or protocol for delivery updates regarding changes to an electronic order book. In the below example protocol, a transaction ID field may be provided. This field may be populated with the transaction ID as discussed herein.

Example Protocol Specification

TABLE 1

Example Data Field Types

| Type | Size | Description |
| --- | --- | --- |
| Alpha | Variable | Left justified and right padded. |
| Numeric | 1, 2, 4 or 8 bytes | Unsigned integer encoded in network order. |
| Price | 4 bytes | Signed integer encoded in network order. The number of decimals is specified in the order book directory message. |
| Date | 4 bytes | Unsigned integer encoded in network order. The value of the field is (year * 10000) + (month * 100) + day. YYYYMMDD |

In certain example embodiments, timestamps are sent in two separate parts. One part may be a standalone message that carries the current second (e.g., as recognized by an example exchange computer system) and another part may be a nanosecond field that is included in other message types. electronic order data messages.

TABLE 2

Example Timestamp Message Types

| Timestamp Portion | Message Type | Notes |
| --- | --- | --- |
| Seconds | Standalone message | Unix time (number of seconds since 1970-01-01 00:00:00 UTC) Note: a timestamp second message may |

TABLE 2-continued

Example Timestamp Message Types

| Timestamp Portion | Message Type | Notes |
| --- | --- | --- |
| | | be sent for every second having at least one other ITCH message. |
| Nanoseconds | Field within individual messages. | Reflects the number of nanoseconds since the most recently communicated second. |

In certain example embodiments, an example electronic timestamp data message of a second message type may have the following fields:

TABLE 3

Example Timestamp Message

| Name | Offset | Length | Value | Notes |
| --- | --- | --- | --- | --- |
| Message Type | 0 | 1 | "T" | Timestamp - seconds message |
| Second | 1 | 4 | Numeric | Unix Time (Number of seconds since 1970-01-01 00:000:00 UTC) |

In certain example embodiments, at the start of each trading day, directory messages for an order book are sent for all active securities (for example, U.S. treasuries) in the exchange system. Order book directory messages may also be sent intraday when existing securities are modified or new securities are added. An example order book directory message is as follows:

TABLE 4

Example Order Book Directory Message

| Field Name | Offset | Length | Value | Notes |
| --- | --- | --- | --- | --- |
| Message Type | 0 | 1 | "R" | Order book Directory Message |
| Timestamp - Nanoseconds | 1 | 4 | Numeric | Nanoseconds portion of the timestamp. |
| Order book ID | 5 | 4 | Numeric | Unique identifier of an Order book. This identifier will not change until this security is no longer tradable. |
| Symbol | 9 | 20 | Alpha | UST security symbol in the eSpeed trading system e.g. usg_05Y |
| Security Description | 29 | 16 | Alpha | Instrument Description |
| CUSIP | 45 | 9 | Alpha | CUSIP code identifying security |
| TSID | 54 | 1 | Numeric | Trading System ID handling this security |
| Product | 55 | 1 | Numeric | Values:<br>1 = US Treasury (Notes and Bonds)<br>2 = US Treasury Bills<br>3 = US Treasury FRNs<br>4 = TIPS |
| Product Subtype | 56 | 1 | Numeric | Values:<br>1 = Benchmark<br>2 = Off-the-Run<br>3 = WI |
| Price Type | 57 | 1 | Alpha | Indicates<br>"U" ('per unit' price type) The security of this type trades in fractions of $256^{th}$.<br>"Y" (price as percentage) The security of this type trades in Yield. The number of decimal places in price is specified by "Price Decimals" field.<br>"B" (Yield Spread) The security of this type trades in basis point. The spread is specified by "Price Decimals" field. |
| Price Decimals | 58 | 2 | Numeric | The number of decimals used in price or yield for this order book in eSpeed system. |
| Yield Decimals | 60 | 2 | Numeric | For securities that do not trade in Yield but will have yield published, this field describes number of decimals for yield field. If Yield Decimals is set to −1 then Yield field should be ignored in all messages for this security. |

TABLE 4-continued

Example Order Book Directory Message

| Field Name | Offset | Length | Value | Notes |
| --- | --- | --- | --- | --- |
| Coupon Decimals | 62 | 2 | Numeric | The number of decimals used in the Coupon field. If Coupon is not used, this field will be set to −1. |
| Quantity Multiplier | 64 | 4 | Numeric | For example, 1 million is used for US Treasury Notes. |
| Price Tick Size | 68 | 2 | Numeric | The price tick for the instrument |
| Maturity | 70 | 4 | Numeric | Maturity date |
| Coupon | 74 | 4 | Numeric | Coupon Rate |
| Dated Date | 78 | 4 | Numeric | Dated Date |
| Issue Date | 82 | 4 | Numeric | Issue Date |
| Auction Date | 86 | 4 | Numeric | Auction Date |
| Announcement Date | 90 | 4 | Numeric | Announcement Date |
| First Coupon Date | 94 | 4 | Numeric | First Coupon Date |
| Settlement Date | 98 | 4 | Numeric | Settlement Date |
| Index | 102 | 4 | Numeric | Index Reference Rate |
| Spread | 106 | 4 | Numeric | Spread Rate |
| Trading Features | 110 | 2 | Numeric | 2 Byte field specifying features supported by this security. Supported features are represented by the corresponding bit being set. Bits in hex: 0x0001 - Locked Market supported 0x0002 - Priority supported 0x0004 - Continuous Block Trading supported 0x0008 - Discretion supported 0x0010 - Grey Discretion supported |
| Minimum Entry Quantity | 112 | 4 | Numeric | The minimum visible quantity of the order allowed to be added to the book. |
| Minimum Quantity Increment | 116 | 4 | Numeric | The minimum increment for visible quantity of the order. |
| Minimum Block Quantity | 120 | 4 | Numeric | The minimum Continuous Block Trading quantity of the order allowed to be added to the book. |
| Maximum Block Bid/Offer Spread | 124 | 4 | Numeric | The visible bid/offer spread on the reference instrument must not exceed this value for dark blocks to match |
| Minimum Block Bid/Offer size | 128 | 4 | Numeric | Visible bid and offer quantities must both meet or exceed this value for dark blocks to match. |
| Minimum Discretion Quantity | 132 | 4 | Numeric | The minimum discretion quantity of the order allowed to be added to the book. |
| Discretion Price Tick Size | 136 | 2 | Numeric | The price tick size for the discretion order for this instrument |
| Maximum Discretion Bid/Offer Spread | 138 | 4 | Numeric | The visible bid/offer spread on the reference instrument must not exceed this value for discretion orders to trade |
| Discretion Market Zone | 142 | 4 | Numeric | Discretion order will only be considered for trading when the discretion order is within number of ticks from best bid/offer specified by market_zone |

In certain example embodiments, an exchange (or a computing system associated with the exchange) may generate and transmit a combination order book director message. This message a specialized directory message used when combined order books are traded in the marketplace. This message type can include standard combinations defined by the exchange (or its operator) and customized combinations created by market participants (or members who subscribe to the electronic data feed. In certain example embodiments, intraday transmissions of this message may occur when new combination order books are added to the system (e.g., for customized combinations). Updates to existing combination order books may also be represented by intraday combination order book directory messages. An example format of a combination order book directory message is follows:

TABLE 5

Example Combination Order Book Directory

| Field Name | Offset | Length | Value | Notes |
|---|---|---|---|---|
| Message Type | 0 | 1 | "M" | Combination Order book Directory Message |
| Timestamp - Nanoseconds | 1 | 4 | Numeric | Nanoseconds portion of the timestamp. |
| Order book ID | 5 | 4 | Numeric | Unique identifier of an Order book. This identifier will not change until the security is no longer tradable. |
| Symbol | 9 | 20 | Alpha | UST security symbol in the eSpeed trading system |
| Security Description | 29 | 16 | Alpha | Instrument Description |
| CUSIP | 45 | 9 | Alpha | Where applicable |
| TSID | 54 | 1 | Numeric | Trading System ID handling this security |
| Product | 55 | 1 | Numeric | Values:<br>1 = US Treasury Coupon Roll<br>2 = US Treasury Bill Roll<br>3 = US Treasury FRN Roll<br>4 = TIPS Roll |
| Price Type | 56 | 1 | Alpha | Indicates<br>"U" ('per unit' price type)<br>The security of this type trades in fractions of $256^{th}$.<br>"Y" (price as percentage)<br>The security of this type trades Yield. The number of decimal places in price is specified by "Price Decimals" field.<br>"B" (Yield Spread)<br>The security of this type trades in basis point. The spread is specified by "Price Decimals" field. |
| Price Decimals | 57 | 2 | Numeric | The number of decimals used in price or yield or spread for this order book in eSpeed system. |
| Quantity Multiplier | 59 | 4 | Numeric | For example, 1 million is used for US Treasury Notes. |
| Price Tick Size | 63 | 2 | Numeric | The price tick for the instrument |
| Yield Decimals | 65 | 2 | Numeric | For securities that do not trade in Yield but will have yield published, this field describes number of decimals for yield field. If Yield Decimals is set to −1, then Yield field should be ignored in all messages for this security. |
| Odd Lot Size | 67 | 4 | Numeric | Indicates the number of securities that represent an odd lot for the order book.<br>Note: A value of 0 indicates that this lot type is undefined for the order book. |
| Block Lot Size | 71 | 4 | Numeric | Indicates the number of securities that represent a block lot for the order book.<br>Note: A value of 0 indicates that this lot type is undefined for the order book. |

TABLE 5-continued

Example Combination Order Book Directory

| Field Name | Offset | Length | Value | Notes |
| --- | --- | --- | --- | --- |
| Nominal Value | 75 | 8 | Numeric | Nominal Value |
| Leg 1, Symbol | 83 | 20 | Alpha | Leg Symbol |
| Leg 1, Side | 103 | 1 | Alpha | Values:<br>B = As Defined<br>C = Opposite |
| Leg 2, Symbol | 104 | 20 | Alpha | Leg Symbol |
| Leg 2, Side | 124 | 1 | Alpha | Values:<br>B = As Defined<br>C = Opposite |
| Leg 3, Symbol | 125 | 20 | Alpha | Leg Symbol |
| Leg 3, Side | 145 | 1 | Alpha | Values:<br>B = As Defined<br>C = Opposite |
| Leg 4, Symbol | 146 | 20 | Alpha | Leg Symbol |
| Leg 4, Side | 166 | 1 | Alpha | Values:<br>B = As Defined<br>C = Opposite |
| Trading Features | 167 | 2 | Numeric | 2 Byte field specifying features supported by this security. Supported features are represented by the corresponding bit being set. Bits in hex:<br>0x0001 - Locked Market supported<br>0x0002 - Priority supported<br>0x0004 - Continuous Block Trading supported<br>0x0008 - Discretion supported<br>0x0010 - Grey Discretion supported |
| Minimum Entry Quantity | 169 | 4 | Numeric | The minimum visible quantity of the order allowed to be added to the book. |
| Minimum Quantity Increment | 173 | 4 | Numeric | The minimum increment for visible quantity of the order. |
| Minimum Block Quantity | 177 | 4 | Numeric | The minimum Continuous Block Trading quantity of the order allowed to be added to the book. |
| Maximum Block Bid/Offer Spread | 181 | 4 | Numeric | The visible bid/offer spread on the reference instrument must not exceed this value for dark blocks to match |
| Minimum Block Bid/Offer size | 185 | 4 | Numeric | Visible bid and offer quantities must both meet or exceed this value for dark blocks to match. |
| Minimum Discretion Quantity | 189 | 4 | Numeric | The minimum discretion quantity of the order allowed to be added to the book. |
| Discretion Price Tick Size | 193 | 2 | Numeric | The price tick size for the discretion order for this instrument |
| Maximum Discretion Bid/Offer Spread | 195 | 4 | Numeric | The visible bid/offer spread on the reference instrument must not exceed this value for discretion orders to trade |
| Discretion Market Zone | 199 | 4 | Numeric | Discretion order will only be considered for trading when the discretion order is within number of ticks from best bid/offer specified by market_zone |

In certain example embodiments, a system event message may be provided that is used to signal a market or data feed handler event. An example format of such a message is follows:

TABLE 6

Example System Event Message

| Field Name | Offset | Length | Value | Notes |
|---|---|---|---|---|
| Message Type | 0 | 1 | "S" | System Event Message. |
| Timestamp | 1 | 4 | Numeric | Nanoseconds portion of the timestamp. |
| TSID | 5 | 1 | Numeric | ID for eSpeed UST trading system/room (system level only) |
| Event Code | 6 | 1 | Alpha | See System Event Codes below. |
| Event Reason | 7 | 1 | Alpha | Please see the System Event Reason Table |
| Order book ID | 8 | 4 | Numeric | Used to identify if the event applies to a single order book within the Trading System. Order book Code set to 0 if the event applies at a System level. |

In certain example embodiments, an electron market data feed may have the following event codes and event reasons that may be used on a daily basis for the data feed.

TABLE 7

Example System Daily Event Codes

| Code | Explanation |
|---|---|
| "O" | Start of Messages. Outside of time stamp messages, the start of day message is the first message sent in any trading day. This indicates the System is enabled. |
| "Q" | Start of Trading Session hours. This message is intended to indicate that eSpeed trading system is open and ready to trade |
| "M" | End of Trading Session hours. This message is intended to indicate that eSpeed trading session is closed and no orders are available for execution. |
| "C" | End of Messages. This is always the last message sent in any trading day. This indicates the system is disabled. |

TABLE 8

Example System Event Reason

| System Event Reason | Explanation |
|---|---|
| "T" | Accepting/Holiday session starts. This is applicable to Japan holidays |
| "A" | Break. This is applicable to potential breaks including UK Holidays |
| "B" | Resumption after Break. This is applicable potential breaks and resumptions including UK holidays |
| "H" | Early Close. This indicates the early market close |
| "R" | Regular start of the day or end of the day. |
| Reserve | Reserve |

The following is an example order book state message that relays information concerning state changes in the exchange or an order book (or a group of order books) of the exchange.

TABLE 9

Example Order Book State Message

| Field Name | Offset | Length | Value | Notes |
|---|---|---|---|---|
| Message Type | 0 | 1 | "O" | Order book State Message. |
| Timestamp - Nanoseconds | 1 | 4 | Numeric | Nanoseconds portion of the timestamp |
| Order Book ID | 5 | 4 | Numeric | Order book identifier |
| State | 9 | 2 | Numeric | |
| Reserved | 11 | 4 | Numeric | |
| Reserved | 15 | 4 | Numeric | |

In certain example embodiments, an electronic market data feed can include a trade state information messages that rely information on trading of workups to the trading community.

TABLE 10

Example Trade State Message

| Field Name | Offset | Length | Value | Notes |
|---|---|---|---|---|
| Message Type | 0 | 1 | "W" | UST security Trading State Message. |
| Timestamp - Nanoseconds | 1 | 4 | Numeric | Nanoseconds portion of the timestamp. |
| Order Book ID | 5 | 4 | Numeric | Unique Order book identifier of a UST security(or an order book) |
| Trading State | 9 | 1 | Alpha | Indicates the current trading state for the stock. Allowable values: "1" = Trade State "0" = BID/OFFER State |
| Trade Price | 10 | 4 | Price | The price of execution initiating trade state. The value will be set to zero and should be ignored in BID/OFFER state. |
| Trade Indicator | 14 | 1 | Alpha | Values; "H" = Hit "T" = Take The value should be ignored in BID/OFFER state. |

In certain example embodiments, an electronic market data feed may include one or more different types of add order messages. An add order message may indicate that a new order has been accepted by the exchange was added to an electronic order book (e.g., one that is publically visible). Step 318 in FIG. 3A may be an example of an add order message. An add order message may include a trading day unique Order Reference Number that is unique per Order book used by exchange to track the order.

The following is an example add order type that may generated in response to acceptable of an unattributed order by the exchange.

TABLE 11

Example Add Order Message

| Field Name | Offset | Length | Value | Notes |
|---|---|---|---|---|
| Message Type | 0 | 1 | "A" | Add Order - No MPID Attribution Message. |
| Timestamp - Nanoseconds | 1 | 4 | Numeric | Nanoseconds portion of the timestamp. |
| Order Reference Number | 5 | 4 | Numeric | The unique reference number assigned to the new order at the time of receipt. |
| Transaction ID | 9 | 4 | Numeric | Transaction ID corresponding to the transaction ID in the response message. |
| Order book ID | 13 | 4 | Numeric | Unique Order book identifier of an instrument |
| Side | 17 | 1 | Alpha | The type of order being added. "B" = buy order. "S" = sell order. |
| Quantity | 18 | 4 | Numeric | The visible quantity of the order being added to the book. |
| Price | 22 | 4 | Price | The display price of the new order. |
| Yield | 26 | 4 | Price | The display yield of the new order. Optional field. If Yield Decimals was set to −1 then this field should be ignored. |

In certain example embodiments, an electronic market data feed may include one or more different types of modify order messages. Modify order messages may include messages that relate to cancellation, execution, replacement, or modification of an order. A modify order message may include an Order Reference Number (as discussed above), Order book ID, and side of the Order to which the update applies.

In examples, the information from multiple different messages may be used to glean information that is otherwise not directly provided by one message. For example, to track the displayed quantity for an order, a subscriber may deduct the quantity in a cancel message (X) and/or order execution messages (E, C, and D) from the last known display quantity for that order. In the case of a replace message (U), the in the message completely replaces the displayed quantity. In certain examples, orders should be removed from the electronic order book when their display quantity reaches zero unless the order has a priority attribute.

In certain example embodiments, an order executed message is provided and is sent whenever an order in the electronic order book is executed in whole or in part. If the incoming or aggressive order causing the match cannot be fully filled, the remainder of that order will be placed in the book after the match has occurred.

As discussed herein, in certain instances it is possible to receive several order executed messages for the same order reference number if that order is executed in several parts (see, e.g., steps 444a and 444b in FIG. 4B). In such instances, multiple order executed messages on the same order are cumulative (e.g., 500+400+5 mean that an aggressive order of 905 fulfilled those three orders). As shown in FIG. 4B, multiple order executed messages that relate to the same aggressive or incoming will have same Transaction ID.

In certain example embodiments, a passive order may gain priority as result of execution. In such a situation, a new place-holder in the electronic order book is created for the priority order with new priority order reference that is set to a size of zero and the price of the original order. New orders entering the book at the same price will have a natural position after this placeholder and will be traded after the priority state is completed.

When the displayed quantity for a priority order reaches zero, it may retain its position in the book until the priority flag is removed by as indicated by a replace message. The display quantity of a priority order will be refilled in its original position in the book.

TABLE 12

Example Order Executed Message

| Field Name | Offset | Length | Value | Notes |
|---|---|---|---|---|
| Message Type | 0 | 1 | "E" | Order Executed Message. |
| Timestamp - Nanoseconds | 1 | 4 | Numeric | Nanoseconds portion of the timestamp. |
| Order Reference Number | 5 | 4 | Numeric | The order reference number associated with the executed order. |
| Transaction ID | 9 | 4 | Numeric | Transaction ID corresponding to the transaction ID in the response message. |
| Order book ID | 13 | 4 | Numeric | Unique Order book identifier |
| Side | 17 | 1 | Alpha | The type of order being traded. Values; "B" = buy order "S" = sell order |
| Executed Quantity | 18 | 4 | Numeric | The quantity executed. |
| Match ID | 22 | 14 | Alpha | The day unique Match Number of this execution |
| Priority Order Reference Number | 36 | 4 | Numeric | Indicate priority for an order if the field value is not zero. This field is a new Order Reference Number for Priority Order with size zero and price of the original order that needs to be added to the book. It serves the purpose of a placeholder in the book, where additional size can be added to this priority orders. |

In certain example embodiments, an order executed with price message is provided as part of an electronic market data feed. This message may be sent in the event that an order in the book is executed in whole or in part at a price different from the initial display price. As the execution price for this order is different than the displayed price of the original add order message, the Exchange may include a price for this execution message.

In certain examples, If the incoming order causing the match cannot be fully filled, the remainder will be placed in the book after the match has occurred. In certain instances, it is possible to receive multiple order executed and order executed with price messages for the same aggressive or incoming order if that order is executed in several parts. Messages for the same order are cumulative. In certain examples, these executions may be marked as non-printable to inform subscribers to ignore this message for purposes of time-and-sales displays or volume calculations. This may be prevent double counting occurrences.

TABLE 13

Example Order Executed With Price Message

| Field Name | Offset | Length | Value | Notes |
| --- | --- | --- | --- | --- |
| Message Type | 0 | 1 | "C" | Order Executed Message. |
| Timestamp - Nanoseconds | 1 | 4 | Numeric | Nanoseconds portion of the timestamp. |
| Order Reference Number | 5 | 4 | Numeric | The unique reference number associated with the executed order. |
| Transaction ID | 9 | 4 | Numeric | Transaction ID corresponding to the transaction ID in the response message. |
| Order book ID | 13 | 4 | Numeric | Unique Order book identifier |
| Side | 17 | 1 | Alpha | The type of order being traded. Values: "B" = buy order "S" = sell order |
| Executed Quantity | 18 | 4 | Numeric | The quantity executed. |
| Match ID | 22 | 14 | Alpha | The unique Match Number assigned by the trading system of this execution. |
| Printable | 36 | 1 | Alpha | Indicates if the execution should be reflected on time and sale displays and volume calculations. "N" = non-printable "Y" = printable |
| Trade Price | 37 | 4 | Price | The price at which the order execution occurred. |
| Trade Yield | 41 | 4 | Numeric | The yield at which the order execution occurred. This field is optional and will be present only for securities that do not trade in yield and require yield. If Yield Decimals was set to −1 then this field should be ignored. |

In certain example embodiments, a two-sided order executed message may be provided. Orders that trigger such messages may occur when an order in the electronic order book is executed in whole or in part against a new aggressive order which gains priority. In this case the remaining untraded part of the aggressive order is added to the book with priority and maintains its position until priority is gone. It should be noted that it is possible for the new aggressive order to trade out in full. In this case the remaining size is zero, but it still acts as a place holder to maintain the position. The price for the newly added aggressive order is a trade price, so no extra field is provided. This single message is a combination of "E" message followed by "A" message that would require priority and potentially allow for zero size. This case is identified by the "New Aggressive Order" flag being set to "Y" in the message.

Another circumstance that may trigger this order message type is when an order in the book is executed in whole or in part against another order that already exists in the book. In this case the executed quantity should be removed from accumulated quantity of both orders participating in this execution. Such a situation may occur in a locked market, when existing priority orders trade, or when priority expires and the remaining matching orders in the book are allowed to trade against each other. This case is identified by having the "New Aggressive Order" flag set to "N" in the message.

In certain examples, this order message type is marked as non-printable (e.g., to assist in preventing double counting).

TABLE 14

Example Two-Sided Order Executed Message

| Field Name | Offset | Length | Value | Notes |
| --- | --- | --- | --- | --- |
| Message Type | 0 | 1 | "D" | Order Executed Message. |
| Timestamp - Nanoseconds | 1 | 4 | Numeric | Nanoseconds portion of the timestamp. |
| Order Reference Number | 5 | 4 | Numeric | The unique reference number associated with the executed passive order in the book. |
| Transaction ID | 9 | 4 | Numeric | Transaction ID corresponding to the transaction ID in the response message. |
| Order book ID | 13 | 4 | Numeric | Unique Order book identifier |

TABLE 14-continued

Example Two-Sided Order Executed Message

| Field Name | Offset | Length | Value | Notes |
|---|---|---|---|---|
| Side | 17 | 1 | Alpha | The type of passive order in the book being traded. Values: "B" = buy order "S" = sell order |
| Executed Quantity | 18 | 4 | Numeric | The quantity executed. |
| Match ID | 22 | 14 | Alpha | The unique Match Number assigned by the trading system of this execution. |
| Priority Passive Order Reference Number | 36 | 4 | Numeric | Indicate priority for passive order if the field value is not zero. This field is a new Order Reference Number for Priority Order with size zero and price of the original order that needs to be added to the book. It serves the purpose of a placeholder in the book, where additional size can be added to this priority orders. |
| New Aggressive Order Flag | 40 | 1 | Alpha | Indicates if this execution is due to new aggressive order or result of trading between two orders existing in the book. Values: "Y" = New Aggressive order "N" = Trade between two existing orders |
| Aggressive Order Reference Number | 41 | 4 | Numeric | The unique reference number associated with the new aggressive order remaining quantity being added to the book. It can be 0 if fully traded |
| Aggressive remaining Quantity | 45 | 4 | Numeric | The remaining aggressive quantity being added to the book. It can be 0 if fully traded. It is also set to zero if the execution is between orders that were already in the book. |
| Aggressive Priority Flag | 49 | 1 | Numeric | Indicate priority attribute of aggressor. This field is a bit map. Low bit will be set to 1 if the order has priority. |
| Printable | 50 | 1 | Alpha | Indicates if the execution should be reflected on time and sale displays and volume calculations. "N" = non-printable "Y" = printable |
| Trade Price | 51 | 4 | Price | The price at which the order execution occurred. |
| Trade Yield | 55 | 4 | Numeric | The yield at which the order execution occurred. This field will be present only for securities that trade in yield and require yield value. If Yield Decimals was set to −1 this field should be ignored. |

In certain example embodiments, an order cancel message is provided that may be sent when an order in the book is modified as a result of either a partial cancellation or complete cancellation. In certain instances, when the display quantity for the retained size reaches zero, the order should be removed from the book.

TABLE 15

Example Order Cancel Message

| Field Name | Offset | Length | Value | Notes |
|---|---|---|---|---|
| Message Type | 0 | 1 | "X" | Order Cancel Message. |
| Timestamp - Nanoseconds | 1 | 4 | Numeric | Nanoseconds portion of the timestamp. |
| Order Reference Number | 5 | 4 | Numeric | The reference number of the order being reduced. |
| Transaction ID | 9 | 4 | Numeric | Transaction ID corresponding to the transaction ID in the response message. |
| Order book ID | 13 | 4 | Numeric | Unique Order book identifier of a UST security |
| Side | 17 | 1 | Alpha | The type of order being added. Values: "B" = buy order "S" = sell order |

TABLE 15-continued

Example Order Cancel Message

| Field Name | Offset | Length | Value | Notes |
|---|---|---|---|---|
| Canceled Quantity | 18 | 4 | Numeric | The quantity being removed from the display size as the result of a cancellation. |

In certain example embodiments, an order replace message is provided for when an order in the book has been modified. For example, when an existing order is changed through an alter action (e.g., changing order attributes of the order and adding quantity to priority order). In such an instances, the side of the order and the order book ID for the order remain the same as the original order. Accordingly, the side and the order book ID cannot be changed for the action that triggers this message. In certain example embodiments, an increase in order size for non-priority orders is done via an action that triggers the add order message. In certain example embodiments, a decrease in order size is accomplished through an action that triggers the cancel order message. In certain example embodiments, a price modification for the order is accomplished with a cancel message followed by an add message.

TABLE 16

Example Order Replace Message

| Field Name | Offset | Length | Value | Notes |
|---|---|---|---|---|
| Message Type | 0 | 1 | "U" | Order Replace Message |
| Timestamp - Nanoseconds | 1 | 4 | Numeric | Nanoseconds portion of the timestamp. |
| Order Reference Number | 5 | 4 | Numeric | The original reference number of the order being replaced. Note that the Order Reference Number does not change when the order is replaced. |
| Transaction ID | 9 | 4 | Numeric | Transaction ID corresponding to the transaction ID in the response message. |
| Order book ID | 13 | 4 | Numeric | Unique Order book identifier |
| Quantity | 17 | 4 | Numeric | The new visible quantity of the order |
| Priority Flag | 21 | 1 | Numeric | Indicate priority attribute for this order. This field is a bit map. Low bit will be set to 1 if the order has priority. |

In certain example embodiments, non-displayable order types may generate trade execution details. The following is an example trade message that may be generated in such circumstances.

TABLE 17

Example Trade Message

| Field Name | Offset | Length | Value | Notes |
|---|---|---|---|---|
| Message Type | 0 | 1 | "P" | Trade Message. |
| Timestamp - Nanoseconds | 1 | 4 | Numeric | Nanoseconds portion of the timestamp. |
| Order book ID | 5 | 4 | Numeric | Unique Order book identifier |
| Executed Quantity | 9 | 4 | Numeric | The quantity executed. |
| Match ID | 13 | 14 | Alpha | The day unique Match Number of this execution This field will be set to blanks if trade message specifies the total quantity traded for some period of time instead of reporting every non-displayable execution. |
| Trade Price | 27 | 4 | Price | The execution price |

Technical Advantages of Described Subject Matter

According to certain example embodiments, data processing requests that are submitted to a data processing computer system may be associated with a transaction ID. The transaction ID may assist in identifying which data processing requests have been acted upon and how they have acted upon by the data processing computer system. In certain example embodiments, client computer systems that submit data processing requests to the computer system may maintain their anonymity even though the results of their submitted requests are publically broadcast as part of an electronic data feed. The inclusion of the transaction ID in such electronic data feed messages may allow correlation and/or identification of messages (and the additional information represented in those messages) that resulted from processing of the previously submitted data transaction requests by the data processing computer system.

In certain example embodiments, the transaction IDs are generated in an increasing (or decreasing manner) so that the messages which are part of public electronic data feed represent how multiple data transaction requests from disparate and distributed data transaction submitters (e.g., client computer systems) have been ordered and/or processed by the data processing computer system. This technique can thus address problems in distributed transaction processing where the order of the processing is relevant, anonymity of the data transaction requests is desirable, and/or it is beneficial for client computer systems to be presented with public information that allows the public information to be traced back (e.g., correlated or identified) to previously submitted data transactions requests (e.g., orders) that are private or proprietary in nature.

Additional Applications of Described Subject Matter

Although various embodiments have been shown and described in detail, the claims are not limited to any particular embodiment or example. None of the above description should be read as implying that any particular element, step, range, or function is essential. All structural and functional equivalents to the elements of the above-described preferred embodiment that are known to those of ordinary skill in the art are expressly incorporated herein by reference and are intended to be encompassed. Moreover, it is not necessary for a device or method to address each and every problem sought to be solved by the present invention, for it to be encompassed by the invention. No embodiment, feature, component, or step in this specification is intended to be dedicated to the public.

The invention claimed is:

1. An electronic exchange computing system comprising:
   a computer storage system configured to store an electronic order book that includes a plurality of pending instrument orders for a given instrument identifier;
   at least one transceiver configured to:
      receive, from remote computing devices, electronic data messages that each include data transaction requests, where a first electronic data message of the electronic data messages includes a first data transaction request;
      transmit, to subscribing computing systems, an electronic data communications feed that includes information relating to changes or updates in the electronic order book;
   a processing system that includes at least one hardware processor coupled to the computer storage system and the transceiver, the processing system configured to:
      responsive to reception of the first data transaction request that is included in the first electronic data message, generate a first data transaction request identifier for the first data transaction request, where the first data transaction request identifier provides a relative temporal indication for when the first data transaction request is processed with respect to other data transaction requests that have different transaction request identifiers;
      generate a second electronic data message that includes the generated first data transaction request identifier and cause the at least one transceiver to transmit the second electronic data message to a remote computing device that is associated with the first data transaction request;
      process the first data transaction request by performing a matching process to match the first data transaction request to at least one of a plurality of contra-side orders that are resting in the electronic order book; and
      based on at least one of the plural contra-side orders being matched against the first data transaction request, generate a separate electronic data feed message for each of the at least one of the matched plural contra-side orders, wherein each generated separate electronic data feed message includes the first data transaction request identifier; and
      cause the transceiver to transmit, as part of the electronic data feed and to the subscribing computing systems, each generated separate electronic data feed message that includes the first data transaction request identifier.

2. The electronic exchange computing system of claim 1, wherein the first data transaction request identifier is generated to be not sequential with a previously-generated data transaction request identifier for another data transaction request.

3. The electronic exchange computing system of claim 2, wherein the first data transaction request identifier is generated to be greater than the previously-generated data transaction request identifier.

4. The electronic exchange computing system of claim 1, wherein a further first data transaction request is a request to add a new order to the electronic order book, cancel an indicated order that is resting in the electronic order book, or modify an indicated order that is resting in the electronic order book.

5. The electronic exchange computing system of claim 1, wherein the first data transaction request is a request to add a new order to the electronic order book, the processing system further configured to:
   responsive to reception of the request to add the new order, generate an order identifier for the new order, the order identifier being different than the generated identifier for the new data transaction request.

6. The electronic exchange computing system of claim 5, wherein each generated separate electronic data feed message also includes the order identifier for the new order.

7. The electronic exchange computing system of claim 5, wherein when the new order is added to the electronic order book, the processing system is further configured to:
   receive, via the at least one transceiver, a second data transaction request that identifies, via the order identifier, the new order;
   in accordance with reception of the second data transaction request, generate a second data transaction request identifier for the second data transaction request, the second data transaction request identifier being greater than, but not sequential with, the first data transaction request identifier;
   process the second data transaction request by modifying at least one characteristic of the new order that is resting in the electronic order book;
   generate a second electronic data feed message that relates to how the second data transaction request was processed, the second electronic data feed message including the second data transaction request identifier;
   cause the transceiver to transmit, as part of the electronic data feed and to the subscribing computing systems, the second electronic data feed message that includes the second data transaction request identifier.

8. The electronic exchange computing system of claim 5, wherein, as part of the performed matching process, multiple matches for the first data transaction request are determined for the plural contra-side orders.

9. The electronic exchange computing system of claim 1, wherein processing the first data transaction request causes at least two separate modifications to the electronic order book.

10. The electronic exchange computing system of claim 1, wherein the at least one transceiver is further configured to:
    transmit a second electronic data feed that relates to changes in properties of the electronic order book, where the changes in the properties are different than the changes in the electronic order book that relate to the electronic data feed,
    wherein the processing system is further configured to:
       generate a second electronic data feed message that relates to a different aspect of how the first data transaction request was processed, the second electronic data feed message including the first data transaction request identifier;
       cause the transceiver to transmit, as part of the second electronic data feed, the second electronic data feed message.

11. The electronic exchange computing system of claim 10, wherein the second electronic data feed message relates to a total size at a level in the electronic order book and each generated separate electronic data feed message relates to a size of an order associated with the first data transaction request.

12. A method of processing electronic data messages submitted to an electronic exchange computing system that includes 1) a computer storage system, 2) at least one transceiver, and 3) a processing system that includes at least one hardware processor coupled to the computer storage system and the at least one transceiver, the method comprising:
> storing an electronic order book that includes a plurality of pending instrument orders for a given instrument identifier;
> processing electronic data messages receive from remote computing devices, each of the electronic data messages including a data transaction request, where a first electronic data message of the electronic data messages includes a first data transaction request;
> transmitting, to subscribing computing systems and by using the at least one transceiver, messages as part of an electronic data communications feed, where the messages include information relating to changes or updates in the electronic order book;
> responsive to reception and/or processing of the first data transaction request, generating, by using the processing system, a first data transaction request identifier for the first data transaction request, where the first data transaction request identifier provides a relative indication for when the first data transaction request is processed, by the processing system, with respect to other data transaction requests that have different transaction request identifiers;
> generating a second electronic data message that includes the generated first data transaction request identifier and causing the at least one transceiver to transmit the second electronic data message to a remote computing device that is associated with the first data transaction request;
> processing the first data transaction request by performing a matching process to match the first data transaction request to at least one of a plurality of contra-side orders that are resting in the electronic order book;
> based on at least one of the plural contra-side orders being matched against the first data transaction request, generate a separate electronic data feed message for each of the at least one of the matched plural contra-side orders, wherein each generated separate electronic data feed message includes the first data transaction request identifier; and
> causing the transceiver to transmit, as part of the electronic data feed and to the subscribing computing systems, each generated electronic data feed message that includes the first data transaction request identifier.

13. The method of claim 12, wherein the first data transaction request is generated to be not sequential with an immediately previously-generated data transaction request identifier for another data transaction request.

14. The method of claim 13, wherein the first data transaction request identifier is generated to be greater than the previously-generated data transaction request identifier.

15. The method of claim 12, wherein the first data transaction request is a request to add a new order to the electronic order book, the method further comprising:
> responsive to reception of the request to add the new order, generating an order identifier for the new order, the order identifier being different than the generated identifier for the new data transaction request.

16. The method of claim 12, wherein processing the first data transaction request causes at least two separate modifications to the electronic order book.

17. The method of claim 12, further comprising:
> transmit, by using the at least one transceiver, a second electronic data feed that relates to changes in the electronic order book, where the messages that are part of the second electronic data feed include information that is different than information included in the messages of the electronic data feed;
> generating a second electronic data feed message that relates to a different aspect of how the first data transaction request was processed by the processing system, the second electronic data feed message including the first data transaction request identifier;
> causing the transceiver to transmit, as part of the second electronic data feed, the second electronic data feed message with the first data transaction request identifier included therein.

18. A non-transitory computer readable storage medium storing computer readable instructions for use with an electronic exchange computing system that includes 1) a computer storage system configured to store a plurality of pending orders as part of an electronic order book, 2) at least one transceiver, and 3) a processing system that includes at least one hardware processor coupled to the computer storage system and the at least one transceiver, the computer readable instructions comprising instructions that cause the processing system to perform actions that include:
> processing electronic data messages receive from remote computing devices, each of the electronic data messages includes a data transaction request, where a first electronic data message of the electronic data messages includes a first data transaction request;
> transmitting, to subscribing computing systems and via the at least one transceiver, messages as part of an electronic data communications feed, where the messages include information relating to changes or updates in the electronic order book;
> responsive to reception and/or processing of the first data transaction request, generating a first data transaction request identifier for the first data transaction request, where the first data transaction request identifier provides a relative indication for processing of the first data transaction request with respect to other data transaction requests that have different transaction request identifiers;
> generating a second electronic data message that includes the generated first data transaction request identifier and causing the at least one transceiver to transmit the second electronic data message to a remote computing device that is associated with the first data transaction request;
> processing the first data transaction request by performing a matching process to match the first data transaction request to at least one of a plurality of contra-side orders that are resting in the electronic order book;
>> based on at least one of the plural contra-side orders being determined to match against the first data transaction request, generate separate electronic data feed message(s) for each of the at least one of the matched plural contra-side orders, wherein each of the separate electronic data feed message(s) includes the first data transaction request identifier; and
> transmitting, as part of the electronic data feed and to the subscribing computing systems and via the at least one transceiver, each generated separate electronic data feed message that includes the first data transaction request identifier.

19. The electronic exchange computing system of claim 1, wherein the first data transaction request identifier is generated to be not sequential with a previously-generated data transaction request identifier for another data transaction request.

\* \* \* \* \*